(12) United States Patent
de Lint et al.

(10) Patent No.: US 12,048,991 B2
(45) Date of Patent: Jul. 30, 2024

(54) CLAMP FOR ELONGATE OBJECTS

(71) Applicant: Hyster-Yale Group, Inc, Fairview, OR (US)

(72) Inventors: Menno de Lint, Oud Gastel (NE); Bram Kuipers, Velp (NE)

(73) Assignee: Hyster-Yale Group, Inc., Fairview, OR (US)

( * ) Notice: Subject to any disclaimer, the term of this patent is extended or adjusted under 35 U.S.C. 154(b) by 46 days.

(21) Appl. No.: 17/506,245

(22) Filed: Oct. 20, 2021

(65) Prior Publication Data

US 2022/0118585 A1    Apr. 21, 2022

Related U.S. Application Data

(60) Provisional application No. 63/094,038, filed on Oct. 20, 2020.

(51) Int. Cl.
  *B25B 5/14*   (2006.01)
  *B25B 5/00*   (2006.01)
  (Continued)

(52) U.S. Cl.
  CPC .............. *B25B 5/147* (2013.01); *B25B 5/006* (2013.01); *B25B 5/163* (2013.01); *F16L 3/1025* (2013.01)

(58) Field of Classification Search
  CPC ......... B25B 5/147; B25B 5/006; B25B 5/163; F16L 3/1016; F16L 3/1025; F16L 3/2235; H02G 3/32

(Continued)

(56) References Cited

U.S. PATENT DOCUMENTS

| 2,174,624 A | 10/1939 | Donald et al. |
| 3,856,246 A * | 12/1974 | Sinko ...................... F16L 3/222 403/294 |

(Continued)

FOREIGN PATENT DOCUMENTS

| CN | 104180074 B | 3/2016 |
| CN | 207753407 U | 8/2018 |

(Continued)

OTHER PUBLICATIONS

DE19845937_Translation (Year: 1999).*

(Continued)

*Primary Examiner* — David S Posigian
*Assistant Examiner* — Jacob Adam Montgomery

(57) ABSTRACT

A clamp comprises first and second clamp halves, each comprising an elongate object receiving portion and a portion of a clamp retention mechanism. The first and second elongate object receiving portions are sized and shaped to cooperatively hold an elongate object at a desired position when the first and second clamp halves are fastened together. The first and second portions of the clamp retention mechanism are sized and shaped to (a) engage each other when the first and second clamp halves are moved towards each other in a first direction, (b) fasten the first and second clamp halves together without requiring use of a tool to engage the retention mechanism, and (c) disengage from each other when the first and second clamp halves are moved away from each other in a direction orthogonal to the first direction to unfasten the first and second clamp halves without use of a tool.

40 Claims, 24 Drawing Sheets

(51) Int. Cl.
*B25B 5/16* (2006.01)
*F16L 3/10* (2006.01)

(58) Field of Classification Search
USPC .......................................................... 269/287
See application file for complete search history.

(56) References Cited

U.S. PATENT DOCUMENTS

| | | | |
|---|---|---|---|
| 4,516,822 A | 5/1985 | Wolfel | |
| 4,612,680 A * | 9/1986 | Daiguji | E01D 19/16 |
| | | | 174/92 |
| 4,707,894 A * | 11/1987 | Friedwald | E06B 3/68 |
| | | | 52/471 |
| 4,718,861 A | 1/1988 | Wood | |
| 4,775,121 A | 10/1988 | Carty | |
| 4,775,122 A | 10/1988 | McClymont | |
| 5,174,782 A | 12/1992 | Bogiel et al. | |
| 5,249,836 A * | 10/1993 | Stanesic | B62D 35/007 |
| | | | 296/180.1 |
| 5,261,633 A * | 11/1993 | Mastro | F16L 3/18 |
| | | | 248/68.1 |
| 5,586,905 A | 12/1996 | Marshall et al. | |
| 5,723,819 A | 3/1998 | Kirma et al. | |
| 5,975,942 A | 11/1999 | Roush et al. | |
| 6,485,325 B1 | 11/2002 | Fukuda | |
| 6,536,982 B2 | 3/2003 | Gibbons et al. | |
| 6,626,696 B2 | 9/2003 | Kondo | |
| 9,225,108 B1 | 12/2015 | Poff | |
| 9,334,924 B2 | 5/2016 | Zheng et al. | |
| 9,553,401 B2 | 1/2017 | Mathews et al. | |
| 10,096,934 B1 | 10/2018 | Desjardins et al. | |
| 2008/0004507 A1 | 1/2008 | Williams et al. | |
| 2014/0224942 A1 * | 8/2014 | Railsback | F16L 3/2235 |
| | | | 248/68.1 |
| 2015/0129725 A1 | 5/2015 | Zedan | |
| 2018/0058611 A1 | 3/2018 | Rillie et al. | |
| 2019/0039747 A1 * | 2/2019 | Gilbertson | B64D 37/32 |

FOREIGN PATENT DOCUMENTS

| | | | |
|---|---|---|---|
| CN | 208090077 U | 11/2018 | |
| DE | 19845937 C1 * | 7/1999 | F16L 3/1041 |
| DE | 19845937 C1 | 7/1999 | |
| EP | 1257011 A3 | 9/2003 | |
| FR | 1085952 A | 2/1955 | |
| GB | 1322924 A | 7/1973 | |
| GB | 1350571 A | 4/1974 | |
| GB | 1396316 A | 6/1975 | |
| GB | 2159669 A | 12/1985 | |
| GB | 2312563 A * | 10/1997 | H02G 7/053 |
| JP | S5719828 U | 2/1982 | |
| JP | 2020087518 A | 6/2020 | |
| WO | 2008140693 A1 | 11/2008 | |
| WO | 2013050064 A1 | 4/2013 | |

OTHER PUBLICATIONS

GB2312563_Translation (Year: 1997).*
Extended European Search Report, EPO Appl. No. 12203382.3; (Mar. 14, 2022).
First Office Action, Chinese Pat. Appl. No. 202122543713.0 (Mar. 10, 2022).
Photograph of a clamp believed to be from Hellermann Tyton, details unknown, date unknown.
Response to First Office Action, Chinese Pat. Appl. No. 202122543713.0 (Apr. 8, 2022).
Response to Second Office Action, Chinese Pat. Appl. No. 202122543713.0 (Aug. 1, 2022).
Second Office Action, Chinese Pat. Appl. No. 202122543713.0 (Jun. 6, 2022).

* cited by examiner

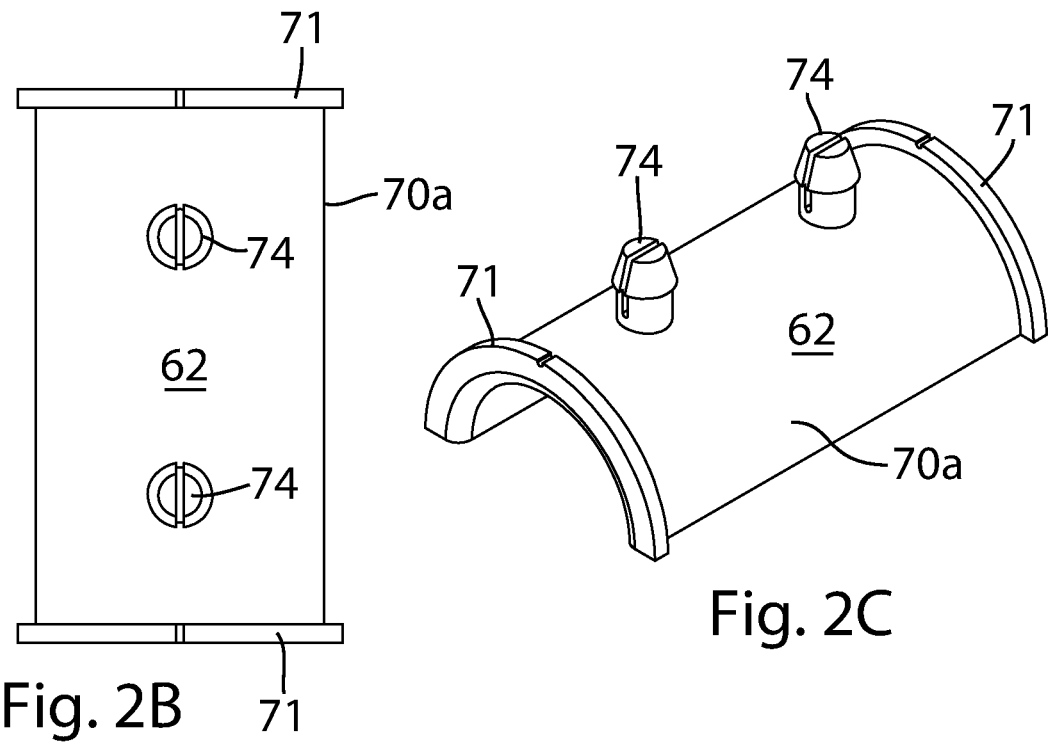
Fig. 2B
Fig. 2C
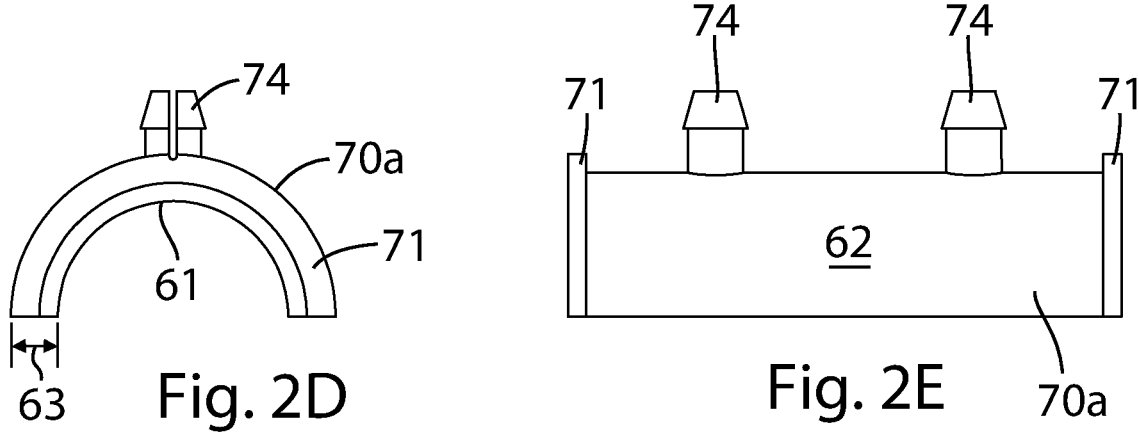
Fig. 2D
Fig. 2E
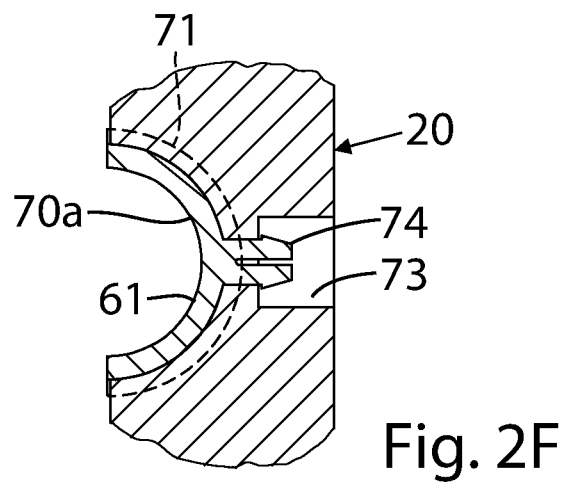
Fig. 2F

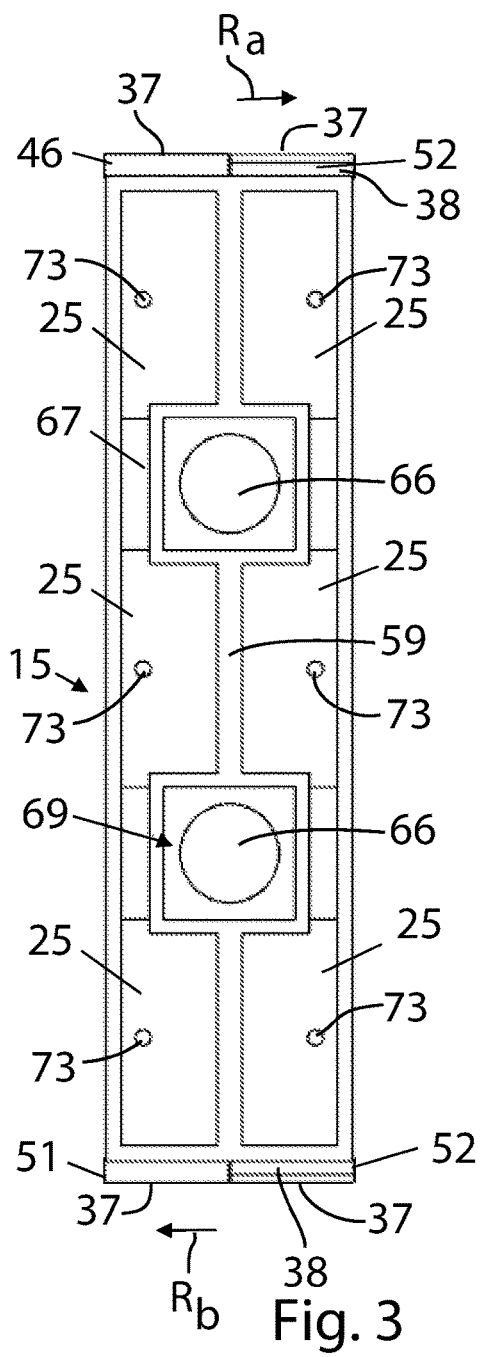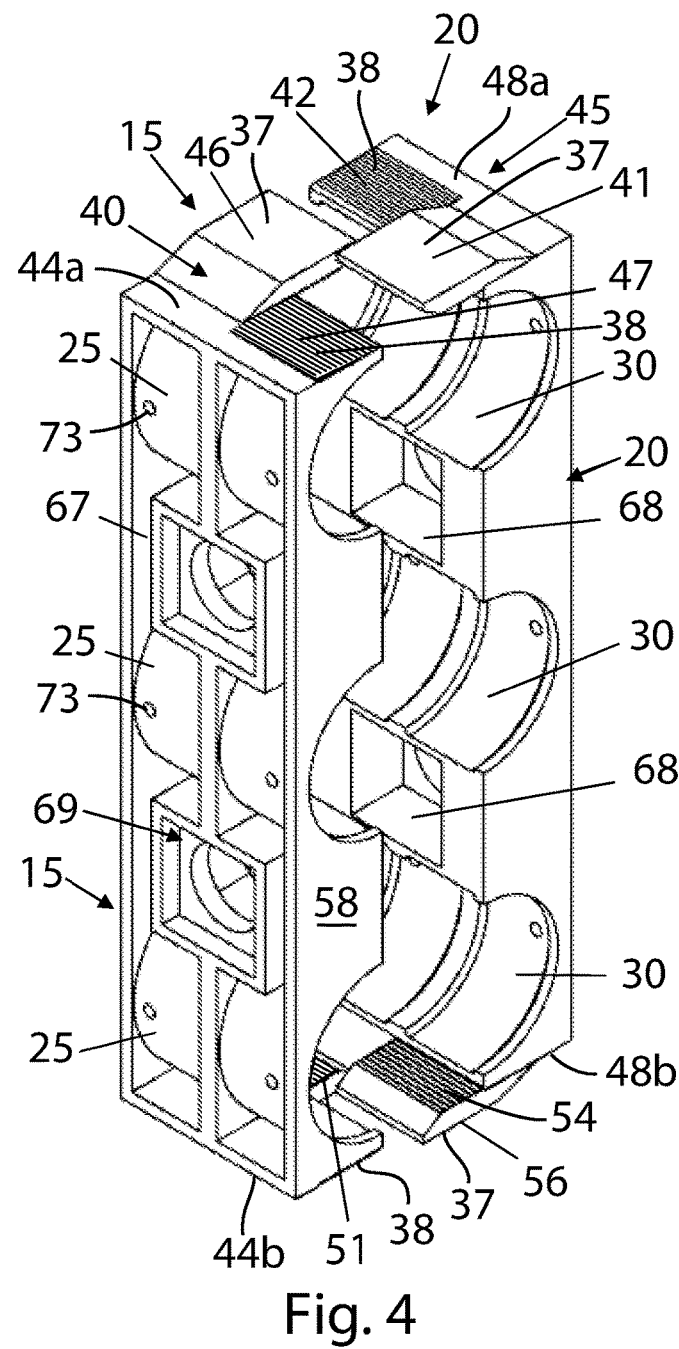
Fig. 3
Fig. 4

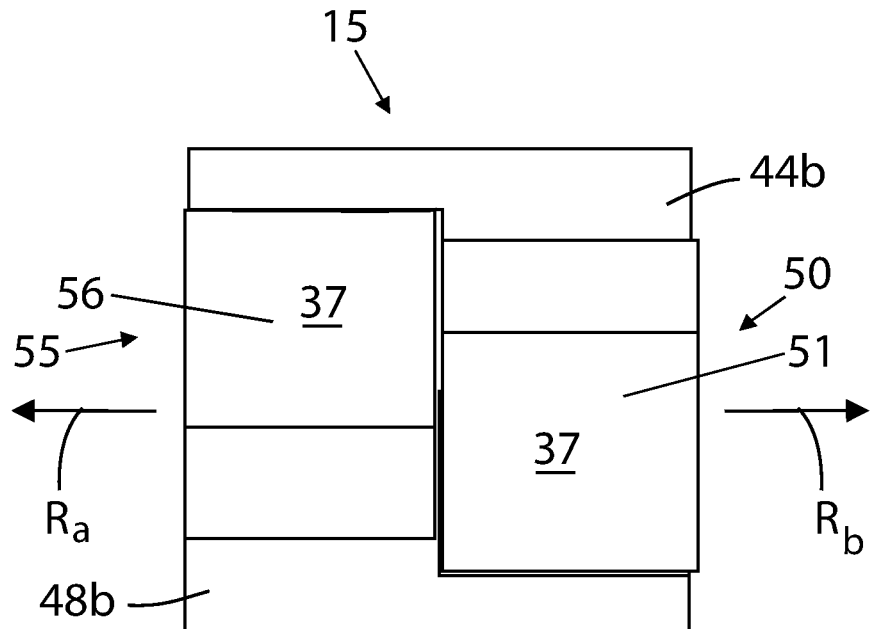
Fig. 6A₁
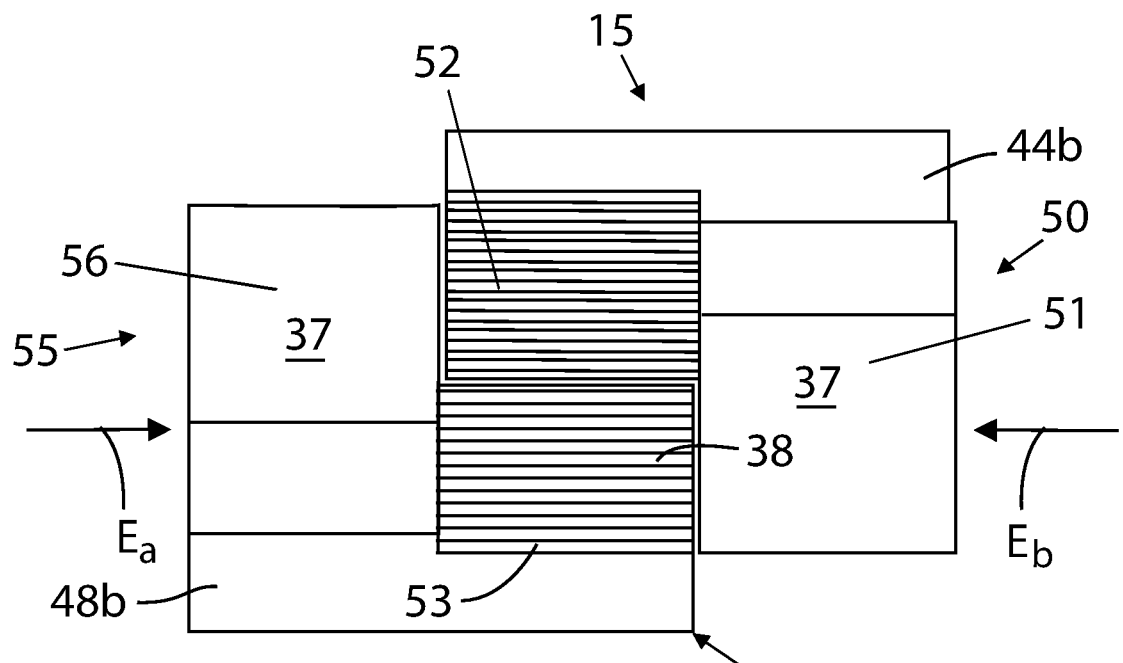
Fig. 6B₁

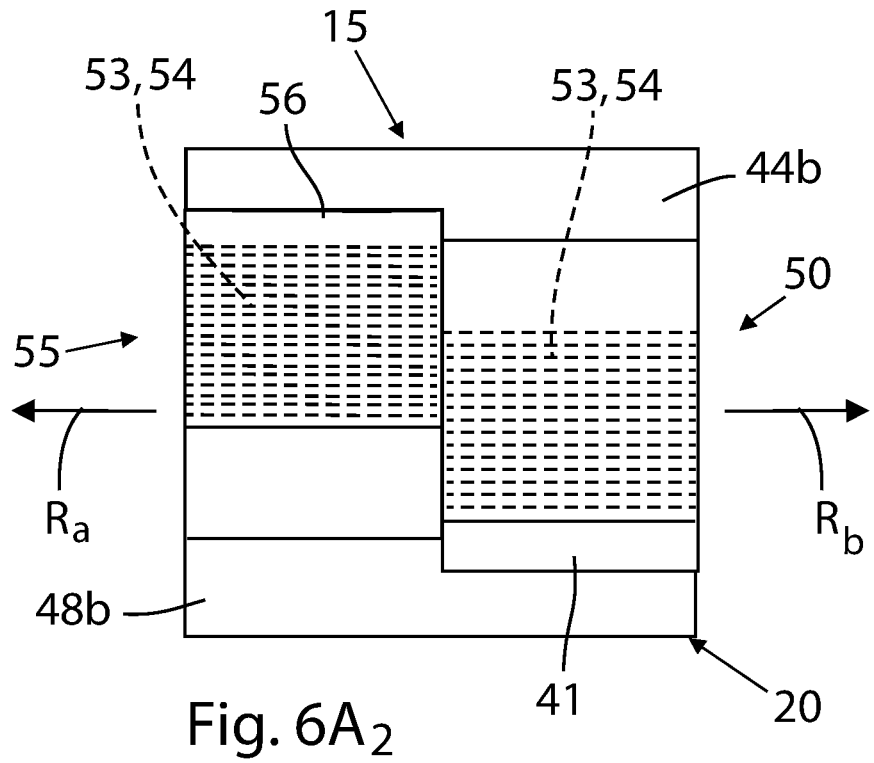
Fig. 6A₂
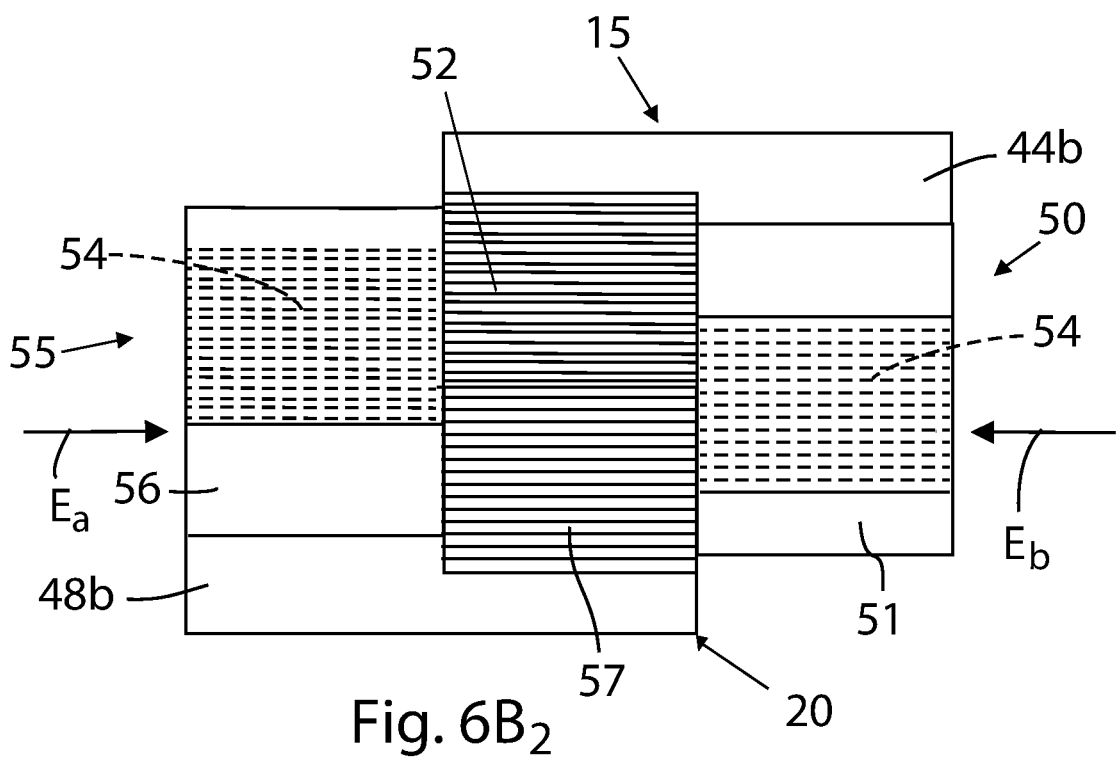
Fig. 6B₂

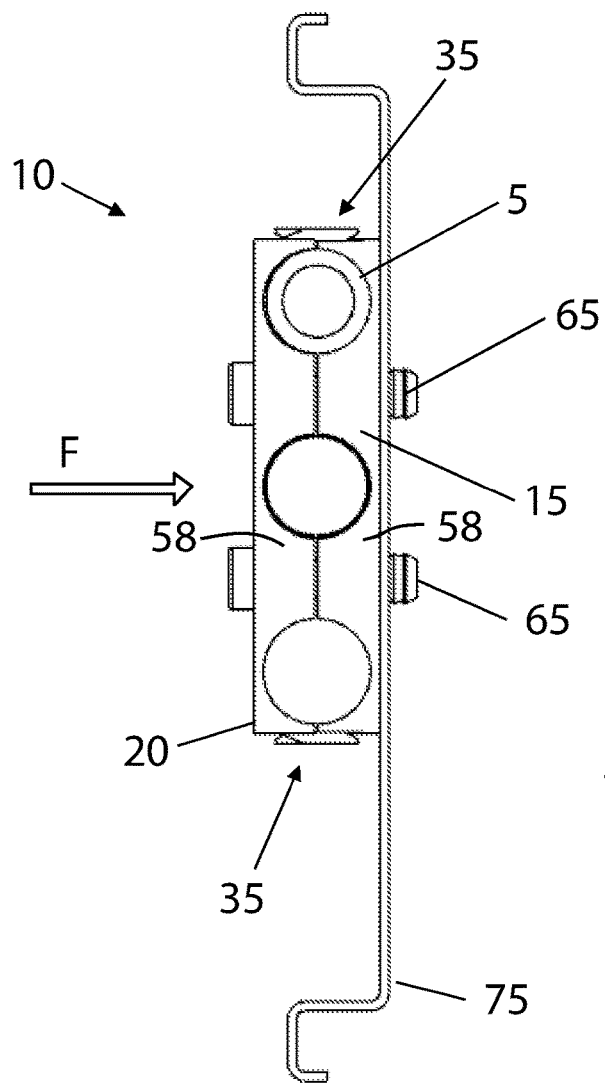
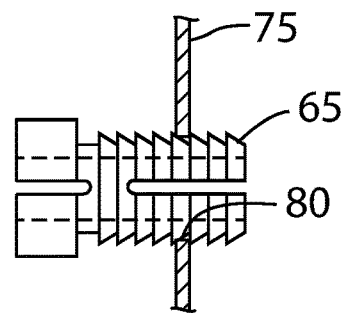
Fig. 7A
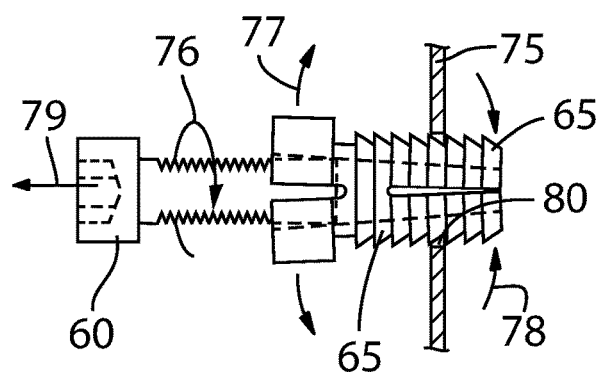
Fig. 7B
Fig. 7

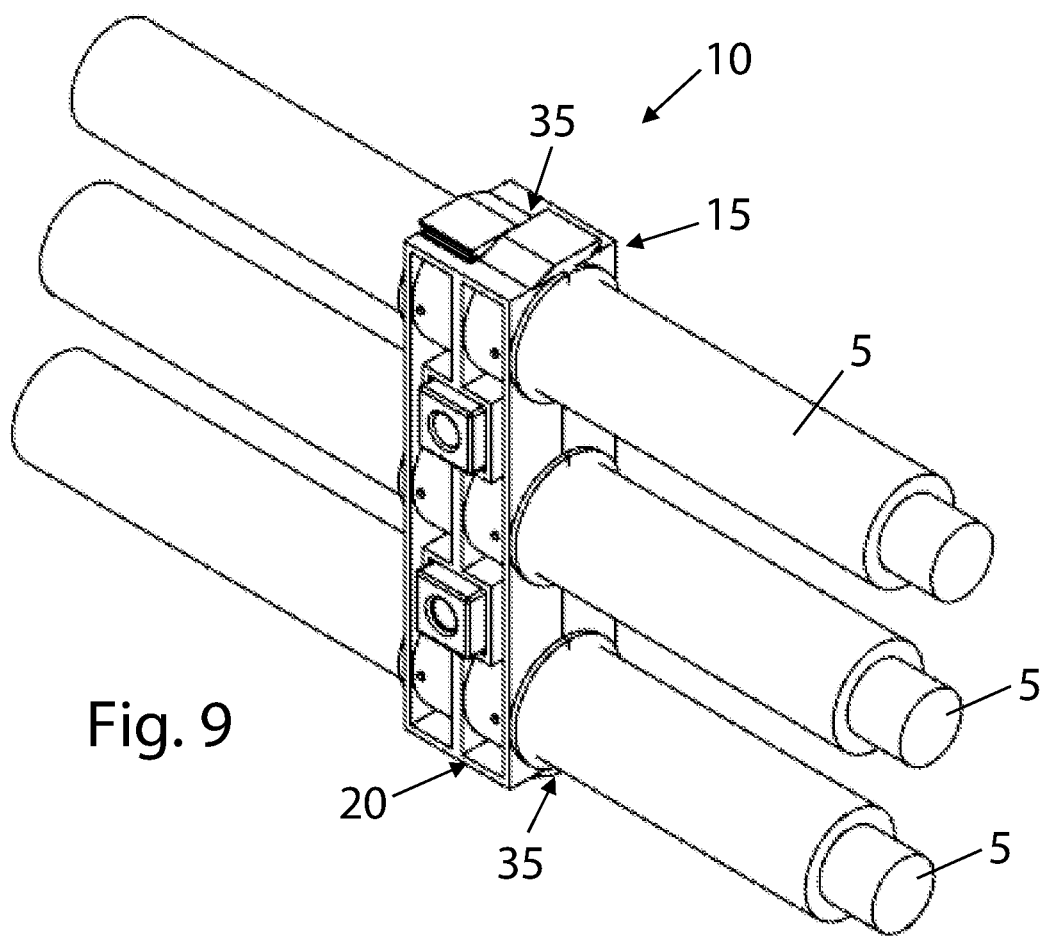

CLAMP FOR ELONGATE OBJECTS

CROSS REFERENCE TO RELATED APPLICATION

This application claims priority to U.S. Provisional Patent Application No. 63/094,038, entitled "Clamp for Elongate Objects," filed Oct. 20, 2020. The entire disclosure of that patent application is incorporated by reference herein.

TECHNICAL FIELD

This disclosure relates to clamps and methods for using clamps for securing elongate objects such as electrical cables and wires, hydraulic hoses, cooling/heating lines, and other suitable objects.

BACKGROUND INFORMATION

Clamps are used in a variety of applications to bundle or route cables and other elongated items. Typical applications for such clamps include construction of houses, offices, factories, personal and industrial vehicles, boats, and airplanes. The clamps typically require the use of tools to secure the cables within the clamps, release the cables from the clamps, secure the clamps to structures, or release the clamps from the structures.

The background description provided herein is for the purpose of generally presenting the context of this disclosure. Unless otherwise indicated herein, the materials described in this section are not prior art to the claims in this application and are not admitted to be prior art by inclusion in this section.

OVERVIEW OF DISCLOSURE

It can be useful to have clamps that are capable of bundling cables without requiring the use of any tool, and that it can be useful to have clamps that may be fastened to structures without the use of any tools. Furthermore, securing clamps, together, to a structure, or both, after fastening clamps without a tool may be useful. The ability to hold elongate objects, such as cables, by a clamp and retain the ability to adjust one or more of the elongate objects before securing the clamp with a fastener may be useful.

Alternatively or additionally, it may be useful to have clamps that are capable of bundling cables without requiring use of a fastener that is separate from the clamp and needed for the clamp to function as a clamp.

In one embodiment, a clamp comprises a first clamp half and a second clamp half. The first half clamp comprises a first elongate object receiving portion and a first portion of a clamp retention mechanism. The second clamp half comprises a second elongate object receiving portion and a second portion of the clamp retention mechanism; wherein the first elongate object receiving portion and the second elongate object receiving portion are sized and shaped to cooperatively hold an elongate object at a desired position when the first clamp half and the second clamp half are fastened together. The first portion of the clamp retention mechanism and the second portion of the clamp retention mechanism are sized and shaped to engage each other when the first clamp half and the second clamp half are moved towards each other in a first direction and are further sized and shaped to fasten the first clamp half and the second clamp half together without requiring use of a tool to engage the retention mechanism. The first portion of the clamp retention mechanism and the second portion of the clamp retention mechanism are further sized and shaped to disengage from each other when the first clamp half and the second clamp half are moved away from each other in a second direction that is orthogonal to the first direction to unfasten the first clamp half from the second clamp half without requiring use of a tool to disengage the retention mechanism.

In some additional, alternative, or selectively cumulative embodiments, a clamp comprises a first clamp half and a second clamp half. The first clamp comprises a first elongate object receiving portion and a first portion of a clamp retention mechanism. The second clamp half comprises a second elongate object receiving portion and a second portion of the clamp retention mechanism. The first elongate object receiving portion and the second elongate object receiving portion are sized and shaped to cooperatively hold an elongate object at a desired position when the first clamp half and the second clamp half are fastened together. The first portion of the clamp retention mechanism and the second portion of the clamp retention mechanism are sized and shaped to engage each other when the first clamp half and the second clamp half are moved towards each other in a first direction and are further sized and shaped to fasten the first clamp half and the second clamp half together to achieve a first fastened clamp state. The first portion of the clamp retention mechanism and the second portion of the clamp retention mechanism are further sized and shaped to engage each other when the first clamp half and the second clamp half are moved toward each other in a second direction that is orthogonal to the first direction to fasten the first clamp half to the second clamp half to achieve a second fastened state, such that the clamp is configured to permit fastening from either of two orthogonal directions.

In some additional, alternative, or selectively cumulative embodiments, a cable clamp kit comprises a first clamp half and a second clamp half. The first clamp half comprises a first elongate object receiving portion, a first portion of a clamp retention mechanism, and a first portion of a clamp securing mechanism that comprises an aperture that is sized and shaped to non-rotationally retain a holding member. The second clamp half comprises a second elongate object receiving portion, a second portion of the clamp retention mechanism, and a second portion of the clamp securing mechanism. The first elongate object receiving portion and the second elongate object receiving portion are sized and shaped to cooperatively hold an elongate object at a desired position when the first clamp half and the second clamp half are fastened together. The first portion of the clamp retention mechanism and the second portion of the clamp retention mechanism are sized and shaped to engage each other when the first clamp half and the second clamp half are moved towards each other in a first direction and are further sized and shaped to fasten the first clamp half and the second clamp half together to engage the retention mechanism, and wherein the first portion of the clamp retention mechanism and the second portion of the clamp retention mechanism are further sized and shaped to disengage from each other when the first clamp half and the second clamp half are moved away from each other in a second direction that is orthogonal to the first direction to unfasten the first clamp half from the second clamp half to disengage the retention mechanism. The kit further comprises a set of half grommets, each having an inner grommet surface and an outer grommet surface that is configured to fit within the first elongate object receiving portion and the second elongate object receiving portion. The set of half grommets includes first half grommets having a first thickness between the inner grommet surface and the outer grommet surface. The set of half grommets includes second half grommets having a second thickness between the inner grommet surface and the outer grommet surface. The first grommet thickness and the second grommet thickness are different. The kit further comprises: a first holding member that comprises a plug that is sized and shaped to pass through the first portion of the clamp securing mechanism to facilitate fastening the first clamp half to a structure without use of a tool; and a mechanical fastener sized and shaped to engage the clamp securing mechanism and to secure the first clamp half and the second clamp half together requiring use of a tool to engage the mechanical fastener with the clamp securing mechanism.

In some additional, alternative, or selectively cumulative embodiments, a method for clamping a cable comprises placing a cable into a cable receiving portion of a first portion of a cable clamp; fastening a second portion of the cable clamp to the first portion of the cable clamp via a mechanism configured to fasten with a snap fit without using a tool; sliding the second portion of the cable clamp away from the first portion of the cable clamp to release the mechanism configured to fasten with a snap fit without using a tool; repositioning the cable in the cable receiving portion; fastening the second portion of the cable clamp to the first portion of the cable clamp via the mechanism configured to fasten with a snap fit without using a tool; and securing the first portion of the cable clamp to the second portion of the cable clamp by engaging a mechanical fastener with a tool.

In some additional, alternative, or selectively cumulative embodiments, a method further comprises fastening the first portion of the cable clamp to a structure without using a tool, wherein securing the first portion of the cable clamp to the second portion of the cable clamp by engaging a mechanical fastener with a tool further comprises simultaneously securing the cable clamp to the structure via the mechanical fastener.

In some additional, alternative, or selectively cumulative embodiments, a method further comprises unfastening the first portion of the cable clamp from the structure without using a tool; and refastening the first portion of the cable clamp to the structure without using a tool.

In some additional, alternative, or selectively cumulative embodiments, the first portion of the clamp retention mechanism and the second portion of the clamp retention mechanism are further sized and shaped to disengage from each other when the first clamp half and the second clamp half are moved away from each other in a second direction that is orthogonal to the first direction to unfasten the first clamp half from the second clamp half to disengage the retention mechanism.

In some additional, alternative, or selectively cumulative embodiments, the first portion of the clamp retention mechanism and the second portion of the clamp retention mechanism are sized and shaped to fasten the first clamp half and the second clamp half together to engage the retention mechanism in either of the orthogonal engagement directions.

In some additional, alternative, or selectively cumulative embodiments, the first portion of the clamp retention mechanism and the second portion of the clamp retention mechanism are sized and shaped to fasten the first clamp half and the second clamp half together without requiring use of a tool to engage the retention mechanism.

In some additional, alternative, or selectively cumulative embodiments, the first portion of the clamp retention mechanism and the second portion of the clamp retention mechanism are sized and shaped to fasten the first clamp half and the second clamp half together without requiring use of a tool to engage the retention mechanism in either of the orthogonal engagement directions.

In some additional, alternative, or selectively cumulative embodiments, the first clamp half and the second clamp half include multiple first elongate object receiving portions and multiple second elongate object receiving portions.

In some additional, alternative, or selectively cumulative embodiments, the first clamp half and the second clamp half are configured to achieve a fastened state without employing an additional separate fastener.

In some additional, alternative, or selectively cumulative embodiments, the first fastened clamp state and the second fastened clamp state are identical.

In some additional, alternative, or selectively cumulative embodiments, the first clamp half and the second clamp half are identical.

In some additional, alternative, or selectively cumulative embodiments, a first portion of a clamp securing mechanism associated with the first clamp half; and a second portion of the clamp securing mechanism associated with the second clamp half.

In some additional, alternative, or selectively cumulative embodiments, a mechanical fastener sized and shaped to engage the clamp securing mechanism and to secure the first clamp half and the second clamp half together requiring use of a tool to engage the mechanical fastener with the clamp securing mechanism.

In some additional, alternative, or selectively cumulative embodiments, the first portion of the clamp securing mechanism comprises an aperture that is sized and shaped to non-rotationally retain a holding member; the clamp further comprises a holding member sized and shaped to fit within the first portion of the clamp securing mechanism; and the clamp further comprises a mechanical fastener sized and shaped to engage the holding member and to secure the first clamp half and the second clamp half together requiring use of a tool to engage the mechanical fastener with the holding member.

In some additional, alternative, or selectively cumulative embodiments, the holding member comprises a plug that is sized and shaped to pass through the first portion of the clamp securing mechanism to facilitate fastening the first clamp half to a structure without use of a tool.

In some additional, alternative, or selectively cumulative embodiments, a portion of the plug that is sized and shaped to pass through the first portion of the clamp securing mechanism (i) is further sized and shaped to have a press fit with an aperture in a structure, (ii) further comprises a threaded aperture that is sized and shaped to receive the mechanical fastener, and (iii) is further sized and shaped to expand when receiving the mechanical fastener such that the interaction between the plug and an aperture in a structure becomes tighter than a press fit.

In some additional, alternative, or selectively cumulative embodiments, the first portion of the clamp retention mechanism comprises a first series of teeth; the second portion of the clamp retention mechanism comprises a second series of teeth; and the first series of teeth and the second series of teeth are sized and shaped to create a cantilever snap fit when the clamp retention mechanism is engaged.

In some additional, alternative, or selectively cumulative embodiments, the first portion of the clamp retention mechanism further comprises a third series of teeth located on a side of the first clamp half opposite from the location of the first series of teeth; the second portion of the clamp retention mechanism further comprises a fourth series of teeth located on a side of the second clamp half opposite from the location of the second series of teeth; and the third series of teeth and the fourth series of teeth are sized and shaped to create a cantilever snap fit when the clamp retention mechanism is engaged.

In some additional, alternative, or selectively cumulative embodiments, the first elongate object receiving portion and the second elongate object receiving portion are configured to receive different half grommets from a set of half grommets, each having an inner grommet surface and an outer grommet surface that is configured to fit within the first elongate object receiving portion and the second elongate object receiving portion, wherein the set of half grommets include first half grommets having a first thickness between the inner grommet surface and the outer grommet surface, wherein the set of half grommets include second half grommets having a second thickness between the inner grommet surface and the outer grommet surface, and wherein the first grommet thickness and the second grommet thickness are different.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2B illustrates a top view of another example of a half grommet having protrusions.

FIG. 2C illustrates a perspective view of the half grommet of FIG. 2B.

FIG. 2D illustrates a front view of the half grommet of FIG. 2B.

FIG. 2E illustrates a side elevation view of the half grommet of FIG. 2B.

FIG. 2F illustrates cross-sectional front view of the half grommet of FIG. 2B inserted into an adapter hole in a cable receiving portion of a clamp half.

FIG. 3 illustrates a front view of the clamp of FIG. 1 in a fastened state.

FIG. 4 illustrates an isometric view of the clamp of FIG. 1 in an unfastened state.

FIG. 6A$_1$ illustrates a close-up bottom view of the clamp retention mechanism of the clamp of FIG. 1 in a fastened state.

FIG. 6A$_2$ illustrates a close-up bottom view of the clamp retention mechanism of the clamp of FIG. 1 in a fastened state, showing the hidden overlapping external major surfaces of the landing pads and the internal major surfaces of the levers in broken lines.

FIG. 6B$_1$ illustrates a close-up bottom view of the clamp retention mechanism of the clamp of FIG. 1 in an unfastened state aligned for slide fastening.

FIG. 6B$_2$ illustrates a close-up bottom view of the clamp retention mechanism of the clamp of FIG. 1 in an unfastened state aligned for slide fastening, showing the hidden internal major surfaces of the levers in broken lines.

FIG. 7 illustrates a clamp fastened to a structure.

FIG. 7A illustrates an example plug fastened to a structure.

FIG. 7B illustrates an example of a securing fastener that may cooperate with the plug to secure the plug to (and anything it is supporting), or unfasten the plug from, a structure.

FIG. 9 illustrates an example clamp holding cables and not secured to a structure.

DETAILED DESCRIPTION OF EMBODIMENTS

Figure 1:
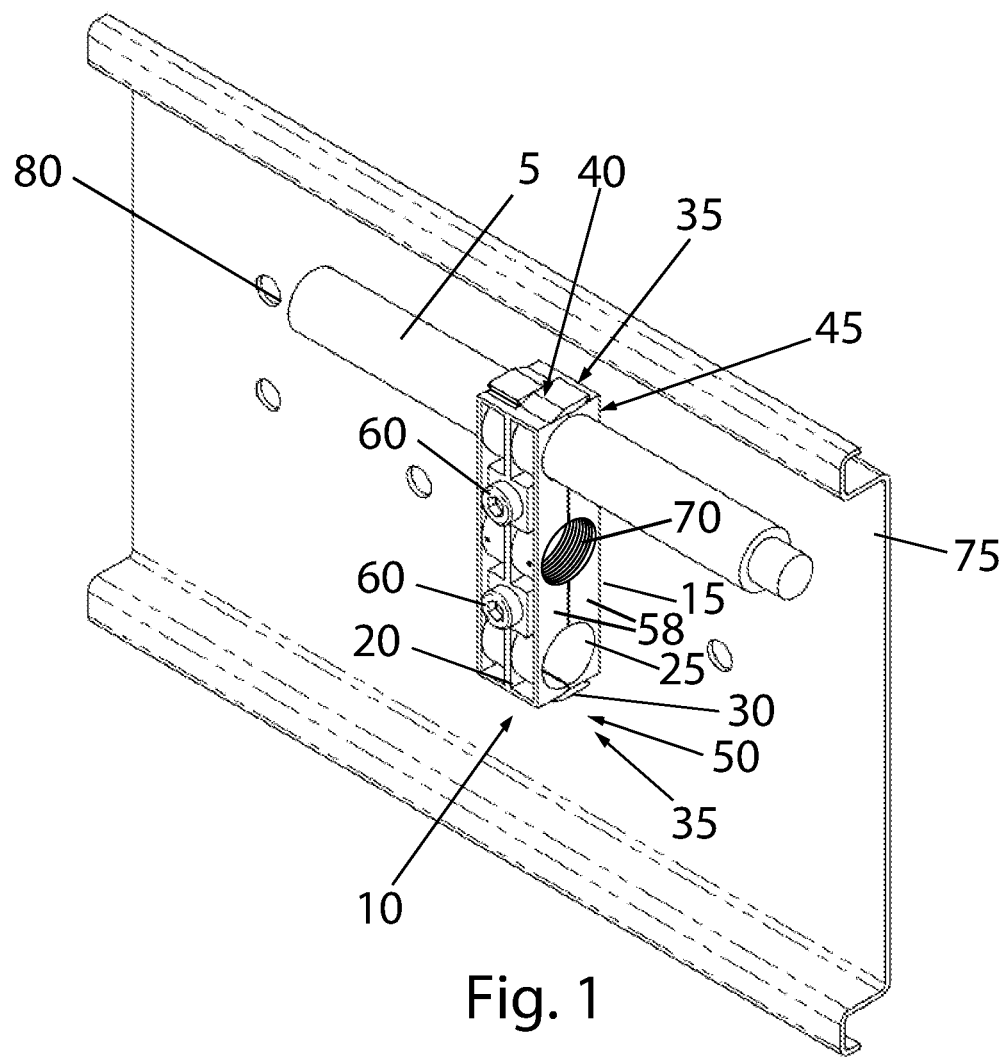
FIG. 1 illustrates an example clamp secured to a structure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. The description may use the phrases "in an embodiment," or "in embodiments," which may each refer to one or more of the same or different embodiments. As used herein, the singular forms "a," "an" and "the" are intended to include the plural forms as well, unless the context clearly indicates otherwise. It should be recognized that the terms "comprise," "comprises," "comprising," "includes," "include," "including," "have," "has," and having" when used in this specification, specify the presence of stated features, integers, steps, operations, elements, and/or components, but do not preclude the presence or addition of one or more other features, integers, steps, operations, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Moreover, the phrase "A or B" does not preclude "A and B."

Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. It is to be understood that other aspects and alternate embodiments may be utilized and structural or logical changes may be made without departing from the scope of the present disclosure and without departing from the scope of the claimed inventions. It is also to be understood that method steps are recited in an order for explanatory purposes, but method steps may be performed in different orders or simultaneously.

Moreover, various operations may be described as multiple discrete actions or operations in turn, in a manner that is most helpful in understanding the claimed subject matter. However, the order of description should not be construed as to imply that these operations are necessarily order dependent or that they are required. In particular, these operations may not be performed in the order of presentation, and described operations may be performed in a different order than the described embodiment. Various additional operations may be performed and/or described operations may be omitted in additional embodiments.

In one embodiment, a cable clamp comprises a first clamp half comprising a first cable receiving portion and a first portion of a clamp retention mechanism and a second clamp half comprising a second cable receiving portion and a second portion of the clamp retention mechanism. The first cable receiving portion and the second cable receiving portion are sized and shaped to cooperatively hold a cable at a desired position when the first clamp half and the second clamp half are joined together. The first portion of the clamp retention mechanism and the second portion of the clamp retention mechanism are sized and shaped to engage each other when the first clamp half and the second clamp half are moved towards each other in a first direction and are further sized and shaped to hold the first clamp half and the second clamp half together without requiring use of a tool to engage the retention mechanism. The first portion of the clamp retention mechanism and the second portion of the clamp retention mechanism are also sized and shaped to disengage from each other when the first clamp half and the second clamp half are moved away from each other in a second direction that is orthogonal to the first direction to release the first clamp half from the second clamp half without requiring use of a tool to disengage the retention mechanism. Moreover, in some embodiments, the clamp can be fastened and installed with a single hand. The ease of use saves considerable installation time.

Figure 2:
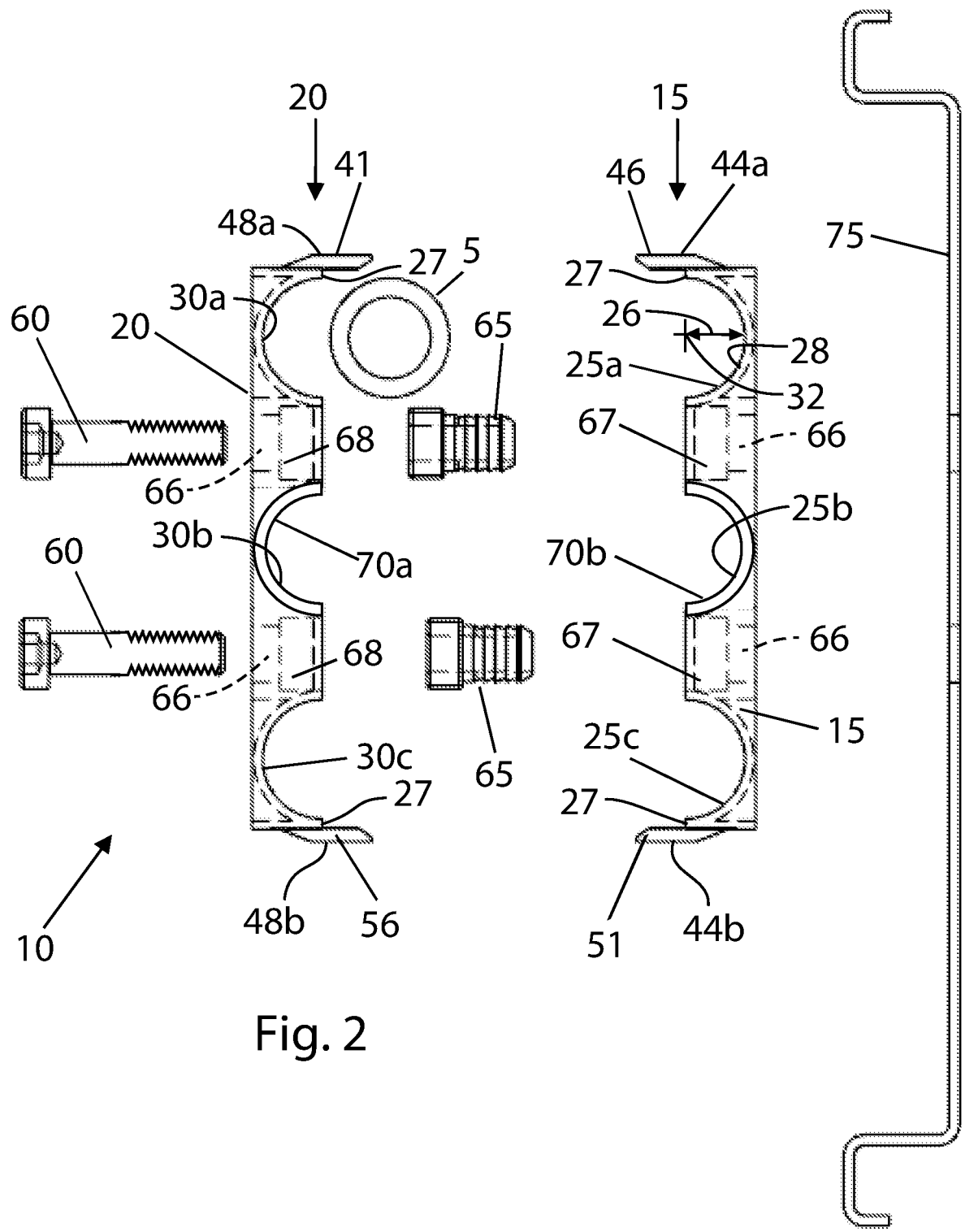
FIG. 2 illustrates an exploded view of the clamp of FIG. 1.

Turning to the figures, FIG. 1 illustrates an example cable clamp secured to a structure and FIG. 2 illustrates the cable clamp of FIG. 1 in an exploded view and not secured to the structure. A cable 5 is retained in place by a cable clamp 10, for example, to bundle cables like the cable 5 together, to route one or more cables like the cable 5 through a structure, such as a vehicle, or for other suitable purposes. A cable clamp 10 comprises a first clamp half 15 and a second clamp half 20. While described as halves, the two portions 15 and 20 do not need to be identical; they may have different sizes and shapes as described later. In some embodiments, however, the clamp halves 15 and 20 may be identical which may facilitate ease of manufacture and stocking parts.

Figure 17:
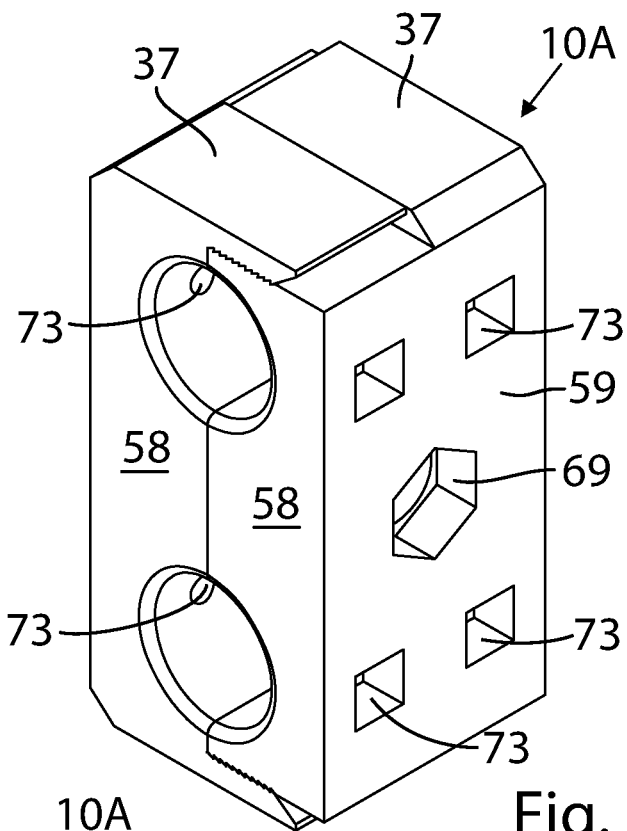
FIG. 17 illustrates an isometric view of an embodiment of a two-cable clamp in a fastened state.
Figure 17A:
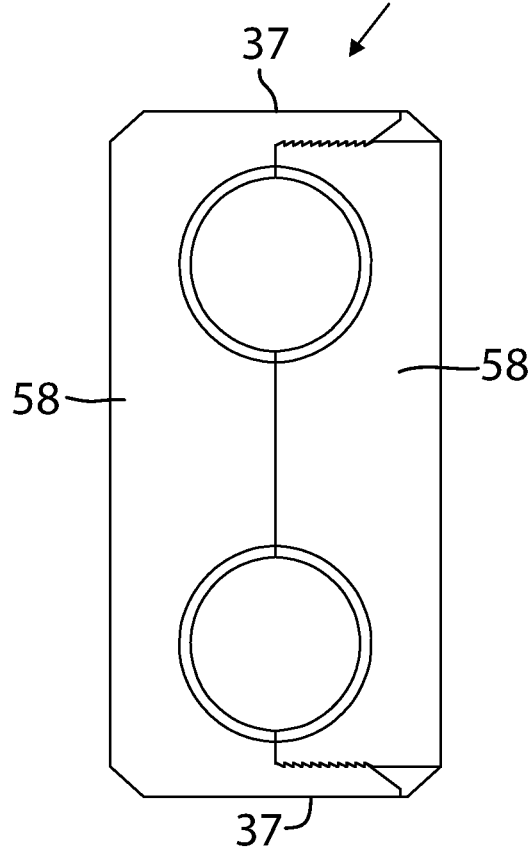
FIG. 17A illustrates a side view of the two-cable clamp of FIG. 17.
Figure 17B:
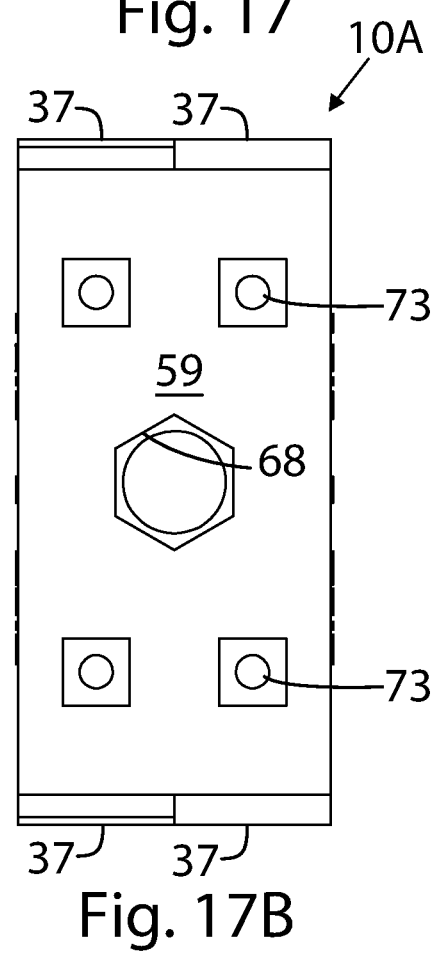
FIG. 17B illustrates a front view of the two-cable clamp of FIG. 17.

The clamp half 15 includes one or more elongate object receiving portions 25, such as one or more of cable receiving portions 25a, 25b, and 25c; and the clamp half 20 includes one or more elongate object receiving portions 30, such as one or more of cable receiving portions 30a, 30b, and 30c. While three cable receiving portions 25 and 30 are illustrated, any number of the cable receiving portions 25 and 30 may be included in other embodiments, such as one or four or more, for example. In some embodiments, the clamp half 15 includes two or more elongate object receiving portions 25, and the clamp half 20 includes two or more elongate object receiving portions 30. FIG. 17 illustrates an isometric view of an embodiment of a two-cable clamp 10 in a fastened state. FIG. 17A illustrates a side view of the two-cable clamp 10 of FIG. 17. FIG. 17B illustrates a front view of the two-cable clamp 10 of FIG. 17.

In some embodiments, the clamp halves 15 and 20 each include three or more respective elongate object receiving portions 25 and 30. In some embodiments, the clamp halves 15 and 20 each include two to twelve respective elongate object receiving portions 25 and 30. In some embodiments, the clamp halves 15 and 20 each include three to eight elongate object receiving portions 25 and 30. One will appreciate that the clamp halves 15 and 20 may each include more than twelve respective elongate object receiving portions 25 and 30. Typically, the clamp halves 15 and 20 each include the same number of respective elongate object receiving portions 25 and 30; however, the clamp halves 15 and 20 may include a different number of respective elongate object receiving portions 25 and 30.

The elongate object receiving portions 25 and 30 typically have semicircular profiles; however, the elongate object receiving portions 25 and 30 may have profiles of other shapes. For example, they may be half square, half rectangular, half elliptical, half noncircular arcuate, half oval, half triangular, half pentagonal, half hexagonal, half octagonal, or any other half-geometric or half-curvature shape. Thus, when the clamp halves 15 and 20 are joined, their joined profile may be square, rectangular, elliptical, noncircular arcuate, oval, triangular, pentagonal, hexagonal, octagonal, or any other geometric or curved shape. One will also appreciate that the elongate object receiving portions 25 and 30 may have different shapes. For example, the cable receiving portions 25a and 25b may have different shapes from each other and have the same shapes as their respective cable receiving portions 30a and 30b; or, the cable receiving portions 25a and 25b may have the same shapes as each other and may have different shapes from those of their respective cable receiving portions 30a and 30b.

Similarly, the elongate object receiving portions 25 and 30 may have different sizes, whether they have the same shape or different shapes. For example, the cable receiving portions 25a and 25b may have different sizes from each other and have the same sizes as their respective cable receiving portions 30a and 30b; or, the cable receiving portions 25a and 25b may have the same sizes as each other and may have different sizes from those of their respective cable receiving portions 30a and 30b.

The elongate object receiving portions 25 and 30 may have a major bisecting dimension 26 from a receiving portion edge 28 to a spaced apart center point 32 and may be sized so that the major bisecting dimension 26 is greater than or equal to 1 mm, greater than or equal to 3 mm, greater than or equal to 5 mm, greater than or equal to 7 mm, or greater than or equal to 9 mm. The major bisecting dimension 26 may be smaller than or equal to 20 mm, smaller than or equal to 15 mm, or smaller than or equal to 10 mm. One will appreciate that alternative ranges between any of these endpoint values are also employable. Moreover, the major bisecting dimension 26 may be smaller than 1 mm, or the major bisecting dimension 26 may be greater than 20 mm.

Figure 2A:
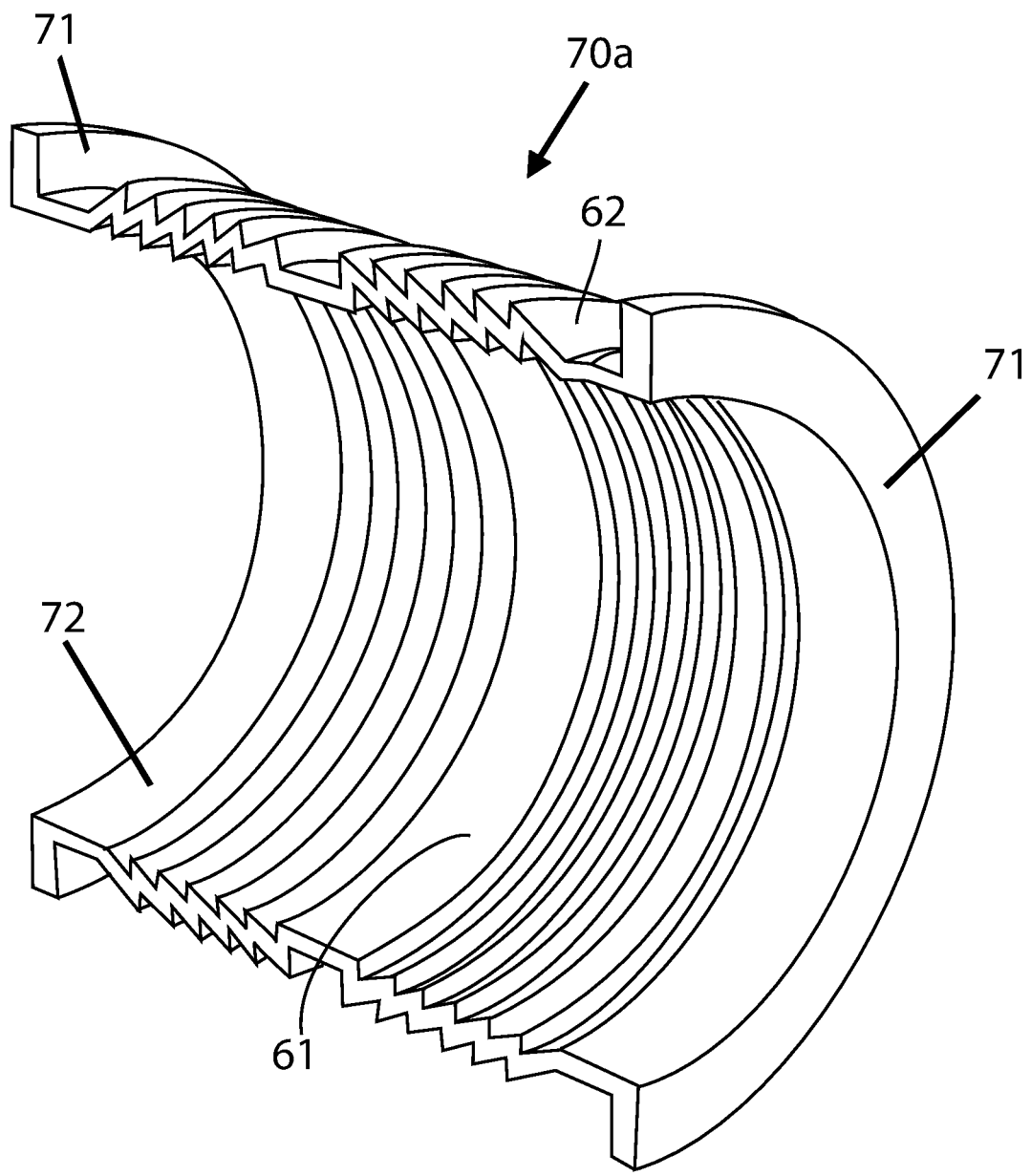
FIG. 2A illustrates a perspective view of an example half of a grommet.

With reference to FIGS. 1, 2, and 2A, an optional split-ring or grommet 70 may be employed to encircle the cable 5, for example if the cable 5 is sufficiently smaller than the opening created by the cable receiving portions 25 and 30. A full grommet 70 may be assembled from multiple pieces, such as grommet halves 70a and 70b, which may or may not be identical. An example grommet half 70a may include one or more optional lips 71 that hinder a fully assembled grommet 70 from laterally sliding within an opening created by cable receiving portions 25 and 30 by engaging one or more of outer sides 58 of the cable clamp 10.

The grommet half 70a may also include ridges 72 that may be compressed into the outer casing of a cable 5, or other suitable elongate object, as the clamp half 15 and the clamp half 20 are fastened and/or secured together around the grommet 70. For example, the grommet 70 may be constructed such that it deforms when compressed by the clamp half 15 and the clamp half 20. The interaction of such ridges 72 with an elongate object may inhibit the elongate object from laterally moving through a clamp 10.

Each half grommet 70a and 70b has an inner grommet surface 61 and an outer grommet surface 62 that is configured to fit within the respective cable receiving portions 25 and 30, and each half grommet 70a and 70b has a grommet thickness between the inner grommet surface 61 and the outer grommet surface 62. The grommets 70 may have different wall thicknesses such that elongate objects with different diameters, for example, between and including 14 mm to 17 mm, may be retained by a clamp 10 having a constant diameter opening, for example, in a range of 18 mm to 20 mm, created by the cable receiving portions 25 and 30. Moreover, the grommet halves 70a and 70 may have their outer sides sized to fit the receiving portions 25 of the previously discussed bisecting dimensions 26, and their thicknesses between their inner sides and their outsides may range from 1 mm to 10 mm, or 1 mm to 5 mm, or 1 mm to 3 mm, for example. Thus, an assembly person may choose appropriately sized grommet halves 70a and 70b to accommodate cables 5 of different diameters. The grommets 70 may also be made from different materials, for example, a material calibrated to inhibit vibration in an elongate material, such as hydraulic vibration or shock, or mechanical vibration or shock. Such materials may include natural rubber or other suitable flexible or elastomeric material configured to absorb shock and vibration.

In some embodiments, the cable receiving portions 25 and 30 may include one or more adapter holes 73 to receive one or more respective protrusions 74 (FIGS. 2B-2F) that can be formed on the grommet halves 70a and 70b. Such adapter holes 73 may facilitate a press fit of the protrusions of grommet halves 70a and 70b into the adapter holes 73 so that they remain in place the cable receiving portions 25 and 30 before the clamp halves 15 and 20 are fastened together. FIG. 2B illustrates a top view of a half grommet 70a having protrusions 74. FIG. 2C-2E illustrate respective perspective, front, and side elevation views of the half grommet 70a of FIG. 2B. FIG. 2F illustrates cross-sectional front view of the half grommet 70a of FIG. 2B inserted into an adapter hole 73 in a cable receiving portion 30 of a clamp half 20.

The cable receiving portions 25 and 30 (with or without the grommet halves 70a and 70b) cooperate to hold cables 5 in position when clamp halves 15 and 20 are joined together. For example, the clamp half 15 and the clamp half 20 may be joined together by bringing one clamp half 15 or 20 into contact with the other clamp half 15 or 20 and applying force, for example by a human or robotic hand, to cause a releasable click lock mechanism 35 (also called snap fit mechanism 35) to engage and fasten the first clamp half 15 with the second clamp half 20. Alternatively, or in addition, a mechanical fastener 60 may engage the first clamp half 15 and the second clamp half 20 and a tool may be used to manipulate the fastener such that the clamp half 15 and the clamp half 20 are secured together.

For this application, the difference between fastening and securing may be understood to be that fastening results in the clamp half 15 remaining in contact with the clamp half 20 in a manner that supports a cable 5 without requiring any tools to be used. Such a fastened clamp 10 may support a cable 5 such that the cable 5 may slide within the cable receiving portions 25 and 30 or the cable 5 may be more tightly held within the cable receiving portions 25 and 30. Like fastening, unfastening may be accomplished without using a tool. In contrast, securing may be understood to result in the clamp half 15 and the clamp half 20 being mechanically bound together by a fastener 60, such as a distinct or independent mechanical fastener, and the application of a tool to such a fastener 60.

In some embodiments, fastening can be accomplished with only the use of one or two hands, wherein the hands are average human hands between the ages of 16 and 65 with average capabilities. In some embodiments, fastening can be accomplished with a force of less than or equal to 350 Newtons. In some embodiments, fastening can be accomplished with a force of less than or equal to 300 Newtons. In some embodiments, fastening can be accomplished with a force of less than or equal to 200 Newtons. In some embodiments, fastening can be accomplished with a force of less than or equal to 100 Newtons. In some embodiments, fastening can be accomplished with a force of less than or equal to 50 Newtons. In some embodiments, fastening can be accomplished with a force of greater than or equal to 5 Newtons. One will appreciate that fastening can be accomplished with a force that is smaller than 5 Newtons or that fastening can be accomplished with a force that is greater than 350 Newtons.

The cable clamp 10 includes a clamp retention mechanism 35 (FIGS. 1 and 5) used to fasten the first clamp half 15 and the second clamp half 20 together. In some embodiments, the clamp retention mechanism 35 is constructed of suitable materials, and is sized and shaped, to accomplish a click together fastening function and a slide apart unfastening function. The clamp retention mechanism 35 may be made from the same materials that a major portion of the clamp halves 15 and 20 are made from. However, the clamp retention mechanism 35 may be made from different materials from that of the major portions of the clamp halves 15 and 20. Moreover, the clamp halves 15 and 20 may be made from the same materials, or they may be made from different materials. Additionally, the clamp halves 15 may have one or more different colors than those of the clamp halves 20, especially for some embodiments wherein the clamp haves 15 and 20 are not identical. Examples of suitable materials include, but are not limited to, one or more of metal, plastic, polymer, and carbon fiber. In some embodiments, the clamp halves 15 and 20 may be cast, molded, injection molded, machined, or 3D printed. The embodiment shown in FIG. 4 is configured to facilitate production by injection molding.

In the example illustrated in FIGS. 1, 2, 3, 4, 5, and 6, the clamp retention mechanism 35 comprises a first portion 40 and 50 (also referred to as first retention portions 40 and 50) associated with clamp half 15 and a second portion 45 and 55 (also referred to as second retention portions 45 and 55) associated with clamp half 20. The first retention portions 40 and 50 may be positioned on respective opposing ends 44a and 44b of the first clamp half 15, and the second retention portions 45 and 55 may be positioned on respective opposing ends 48a and 48b of the second clamp half 20. In some embodiments, the first retention portions 40 and 50 may be mirror images of each other such that the first clamp half 15 may be bilaterally symmetrical, or such that the first clamp half 15 has symmetrical opposing ends 44a and 44b. In some other embodiments, the first retention portions 40 and 50 may be identical to each other such that the first clamp half 15 may not be bilaterally symmetrical, or such that the first clamp half 15 has asymmetrical opposing ends 44a and 44b. Similarly, the second retention portions 45 and 55 may be mirror images of each other such that the second clamp half 20 may be bilaterally symmetrical, or such that the second clamp half 20 has symmetrical opposing ends 48a and 48b. In some other embodiments, the second retention portions 45 and 55 may be identical to each other such that the second clamp half 20 may not be bilaterally symmetrical, or such that the second clamp half 20 has asymmetrical opposing ends 48a and 48b. In some embodiments, the first retention portions 40 and 50 may be identical to the respective second retention portions 45 and 55. However, the first retention portions 40 and 50 may be different from the respective second retention portions 45 and 55 as later described.

Each of the retention portions 40, 45, 50, and 55 may comprise two retention parts that include a toothed or feature-containing landing pad 38 formed in one of the clamp halves 15 or 20 and a toothed or feature-containing lever 37 that may be adjacent to the landing pad 38. The teeth or features may be placed on an external major surface 53 of the landing pads 38 and on an internal major surface 54 of the landing pads 38. The external major surface 53 may have an area that is greater than the area of the internal major surface 54, or the area of the internal major surface 54 may be greater than the area of the external major surface 53, or the two areas may be substantially the same. Typically, the lever 37 will extend beyond the adjacent landing pad 38.

The external major surface 53 may have a length 36 that is greater than a length 39 of the internal major surface 54, or the length 39 may be greater than the length 36, or the two lengths 36 and 39 may be substantially the same. Similarly, the external major surface 53 may have a width 43 that is greater than a width 49 of the internal major surface 54, or the width 49 may be greater than the width 43, or the two widths 43 and 49 may be substantially the same.

In use, the clamp half 15 and the clamp half 20 may be fastened by bringing the two clamp halves 15 and 20 together such that a toothed or feature-containing lever 41 of the clamp half 20 engages a toothed or feature-containing landing pad 47 of the clamp half 15 with a snap fit and such that a toothed or feature-containing lever 46 of the clamp half 15 engages a toothed or feature-containing landing pad 42 of the clamp half 20 with a snap fit. Likewise, a toothed or feature-containing lever 51 of the clamp half 15 engages a toothed or feature-containing landing pad 57 of the clamp half 20 with a snap fit and a toothed or feature-containing lever 56 of the clamp half 20 engages a toothed or feature-containing landing pad 52 of the clamp half 15 with a snap fit.

Figure 5:
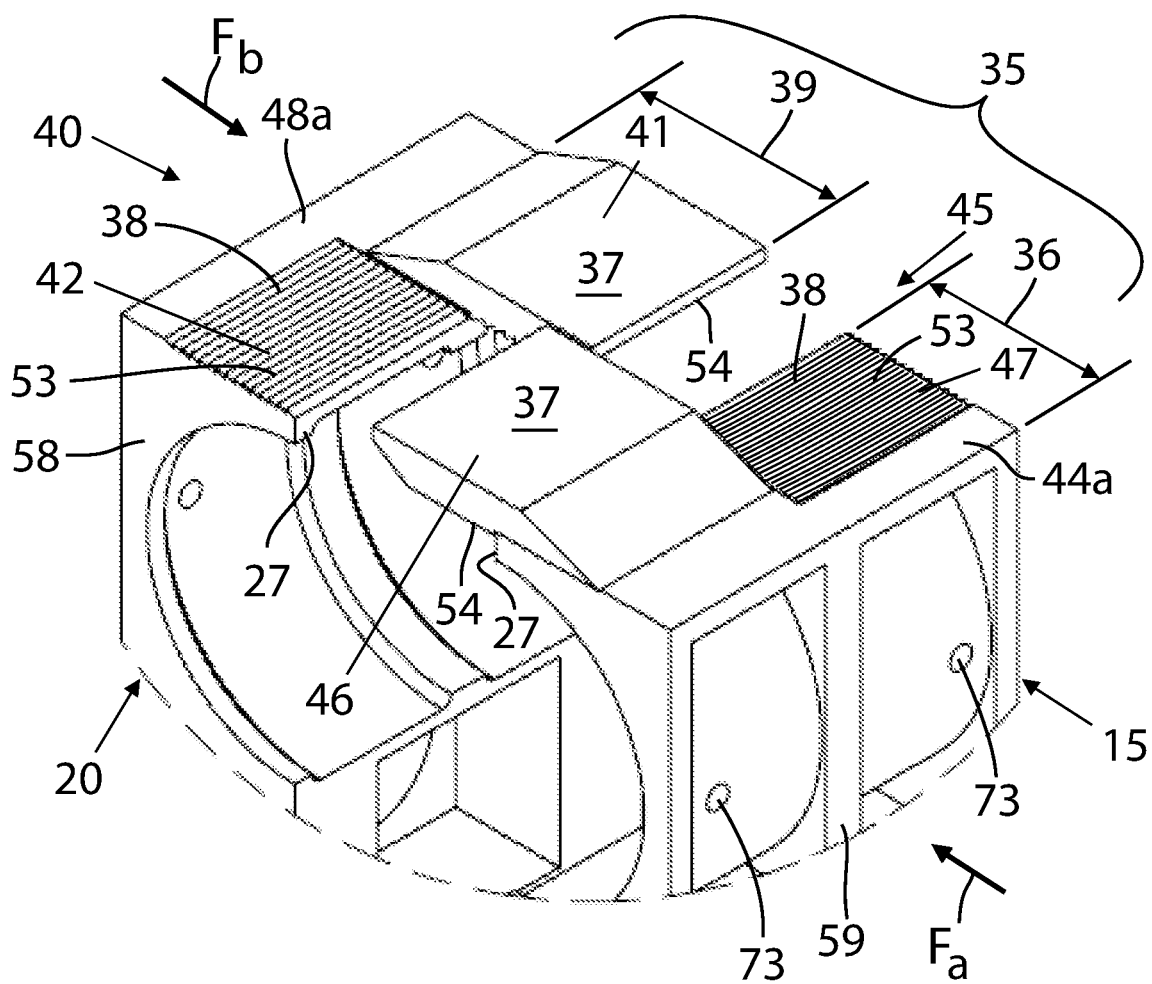
FIG. 5 illustrates a close-up top isometric view of the clamp retention mechanism of the clamp of FIG. 1 in an unfastened state aligned for snap fastening.
Figure 5A:
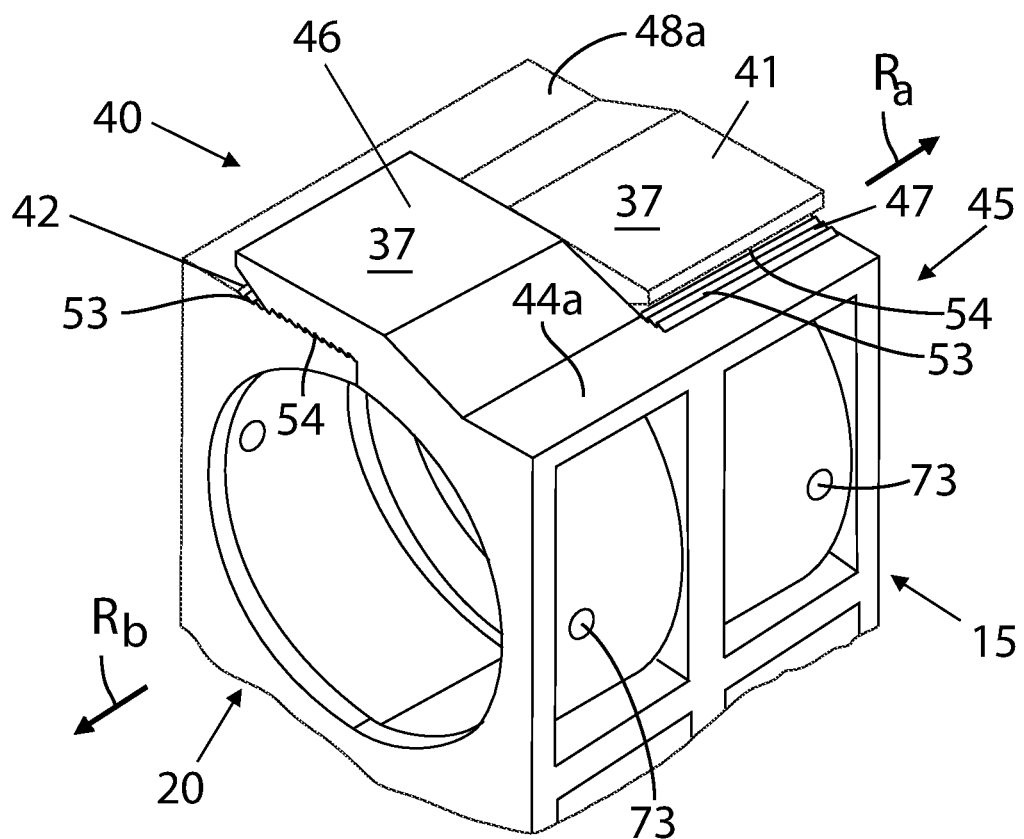
FIG. 5A illustrates a close-up top isometric view of the clamp retention mechanism of the clamp of FIG. 1 in a fastened state.
Figure 6:
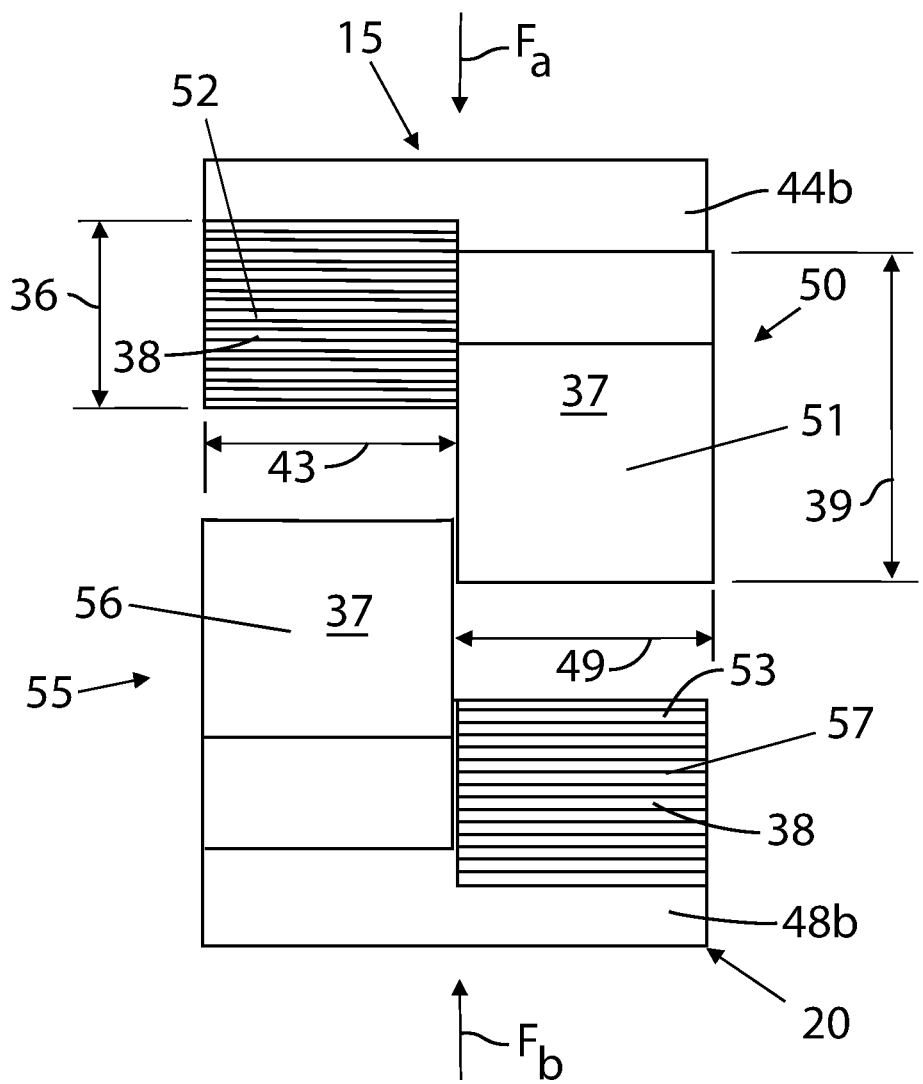
FIG. 6 illustrates a close-up bottom view of the clamp retention mechanism of the clamp of FIG. 1 in an unfastened state aligned for snap fastening.
Figure 7C:
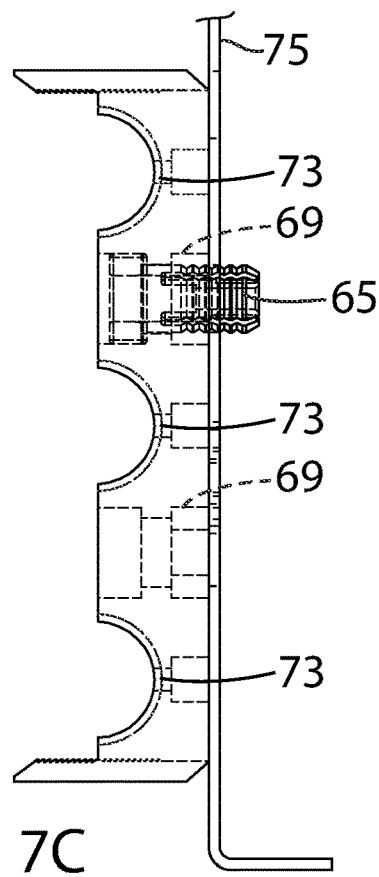
FIG. 7C illustrates a cross-sectional side view of a plug fastening a half clamp to a structure.
Figure 7D:
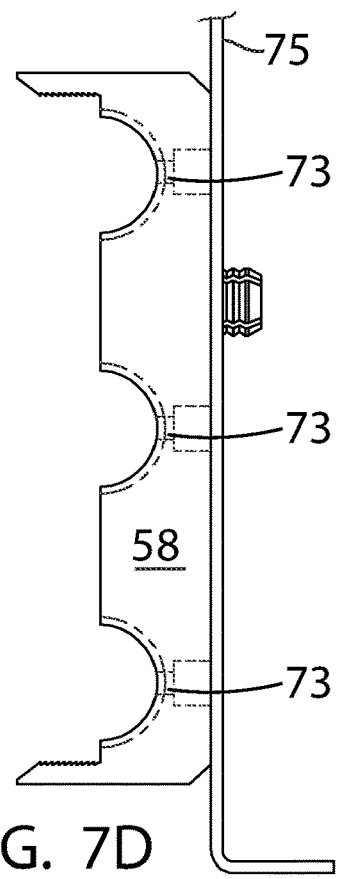
FIG. 7D illustrates a side view of a plug fastening a half clamp to a structure.
Figure 7E:
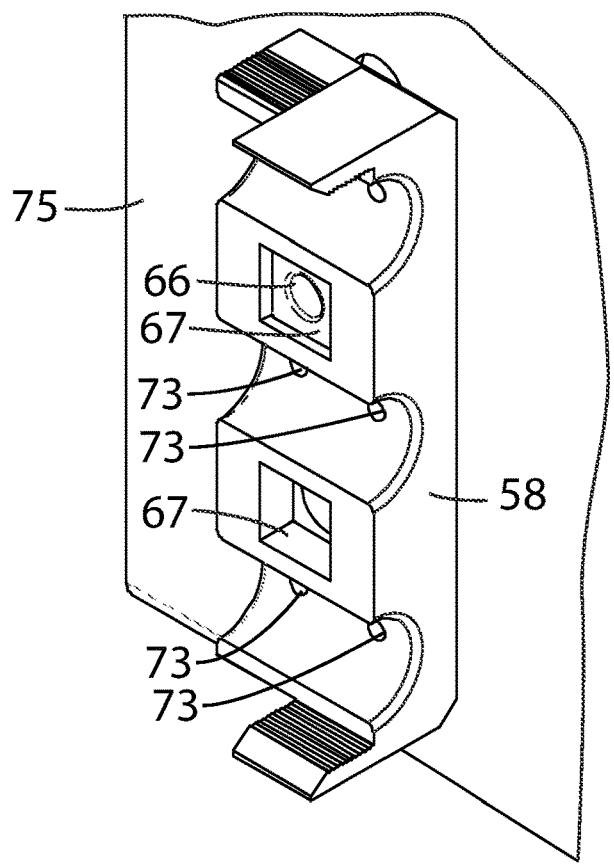
FIG. 7E illustrates an isometric view of a plug fastening a half clamp to a structure.

For example, the clamp half 15 and the clamp half 20 may be fastened by bringing the two clamp halves 15 and 20 together in a first minor axis direction F as shown in FIG. 7 when one clamp half, such as clamp half 15, is attached to a structure, such as a vehicle portion 75. Alternatively, the clamp half 15 and the clamp half 20 may be fastened by bringing the two clamp halves 15 and 20 together in the direction Fa, Fb, or Fa and Fb as shown in FIGS. 5 and 6 when the clamp halves 15 and 20 are fastened to or held against a structure. The directions F, Fa, and Fb may be parallel or colinear and may be orthogonal to a longitudinal axis of the cable 5 where it is supported by the clamp 10. Thus, the first clamp half 15 and the second clamp half 20 may be fastened via a snap mechanism by bringing the two clamp halves 15 and 20 together in the direction that is orthogonal to a longitudinal axis of the cable 5 that the clamp is enclosing.

Additionally, because there may be multiple teeth or features in the retention portions 40, 45, 50, and 55 of the clamp retention mechanism 35, the amount of clamping pressure on cable 5 may be controlled or adjusted without using a tool. In this regard, cables 5 that have a major cross-sectional axis that is greater than or equal to the bisecting dimension 26 of the cable receiving portions 25 may limit the degree of closure of the clamp halves 15 and 20 with respect to each other. However, ledges supporting the levers 37 and landing pads 38 may have prominent edge stops 27 that prevent the clamp halves 15 and 20 from being over-constricted to avoid damage to, or misalignment of, the grooves and teeth (or other complementary protrusions and troughs).

Other suitable snap-to-fasten or click-to-fasten mechanisms may be used. For example, a lever 37, such as the lever 41, may include one or more different types of mating features, such as a single protrusion with a square or rectangular cross-profile, for example. The mating landing pad 38, such as the landing pad 47, may in turn contain a single groove that is sized and shaped to receive the protrusion with a snap fit that still allows the protrusion to be slid out of the groove in a manner similar to that in the discussion below, or to be otherwise released without requiring the use of a tool. One will appreciate that mating features of other cross-sectional shapes, such as other polygonal shapes or shapes with one or more curvatures, may be employed. Furthermore, if multiple protrusions are employed, they may have the same cross-sectional shape or different cross-sectional shapes. One will also appreciate that such distinctly shaped protrusions may be formed onto the landing pads 38 instead of onto the levers 37, or that both the landing pads 38 and the levers 37 may both present such protrusions with the opposing mated landing pads 38 and the levers 37 having mated distinctly shaped troughs. Other suitable mechanisms configured for a snap-fit fastening and a sliding unfastening may be used. In other embodiments, mechanisms configured for a snap-fit fastening and unfastening by unlatching the snap fitting, or by other suitable manner, may be used.

The retention portions 40, 45, 50, and 55 of the clamp retention mechanism 35 may be sized and shaped such that protrusions and troughs (e.g., the teeth and grooves) of engaging portions of the clamp retention mechanism 35 align when the first clamp half 15 is fastened with the second clamp half 20. Such alignment, when fastened, facilitates the protrusions and troughs (e.g., the teeth and grooves) of the levers 37 sliding through the protrusions and troughs (e.g., the teeth and grooves) of the landing pads 38 when the first clamp half 15 and the second clamp half 20 are moved in one or more of second minor axis directions Ra and Rb away from the midline to unfasten the clamp halves 15 and 20. Directions Ra and Rb may be orthogonal to the directions Fa and Fb, in which the snap fastening mechanism 35 was engaged, and Ra and Rb may be the same (parallel or colinear) as the longitudinal direction of the axis of cable 5 in FIG. 1.

Figure 5B:
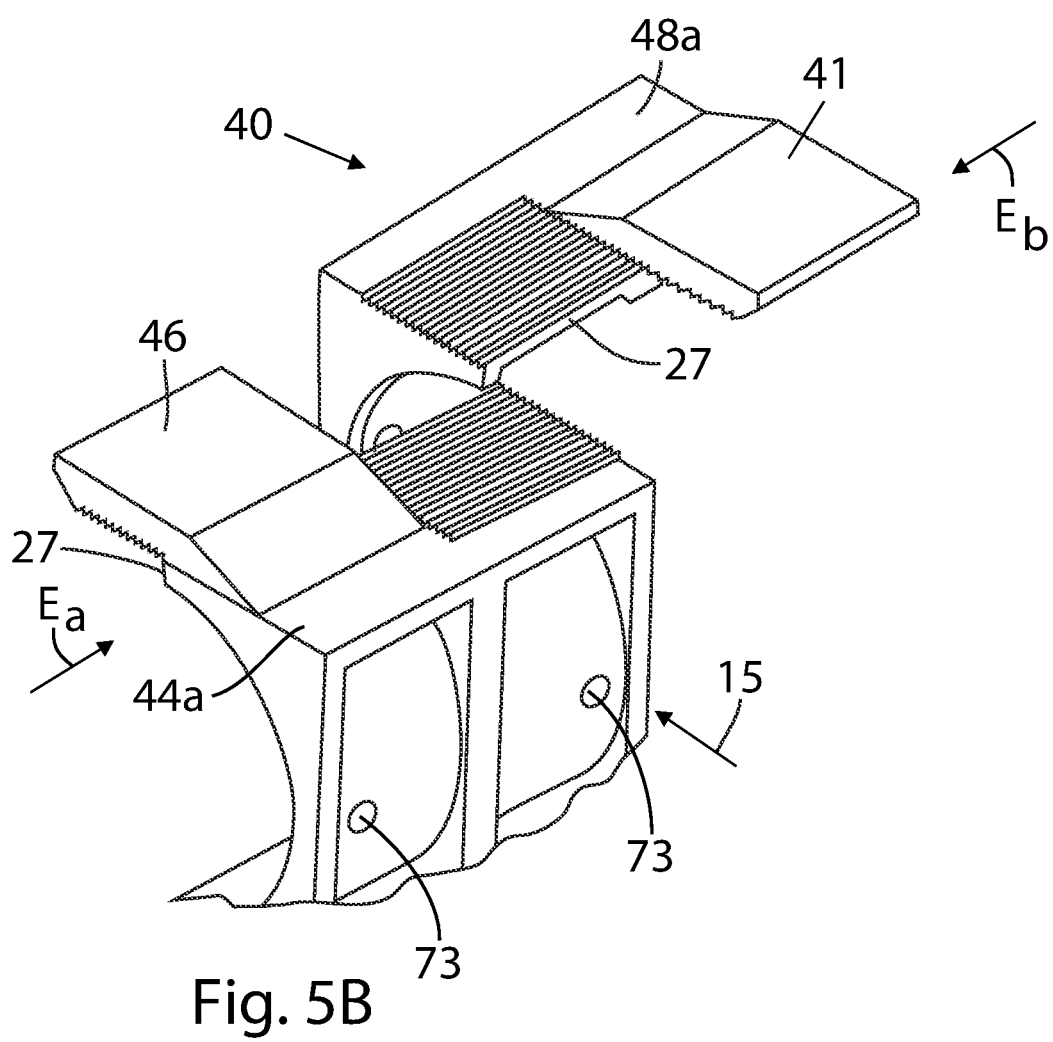
FIG. 5B illustrates a close-up top isometric view of the clamp retention mechanism of the clamp of FIG. 1 in an unfastened state aligned for slide fastening.

With reference to FIGS. 5B, 6B$_1$, and 6B$_2$, one will also appreciate that sliding alignment of the respective levers 37 and landing pads 38 may permit the clamp halves 15 and 20 to be fastened by sliding in directions Ea and/or Eb, which may be opposite to directions Ra and Rb and orthogonal to directions Fa and Fb. By being slidably engageable, the clamp halves 15 and 20 permit the clamp 10 to be deployed in tight spaces which do not have adequate room for snapping the clamp halves 15 and 20 together in directions Fa or Fb. Moreover, there are advantages for a single clamp 10 to be configured to permit fastening from either of two orthogonal directions.

Thus, in some embodiments, a clamp 10 may comprise a first clamp half 15 and a second clamp half 20. The first clamp half 15 has a first elongate object receiving portion 25 and a first portion 40 of a clamp retention mechanism. The second clamp half 20 has a second elongate object receiving portion 30 and a second portion 45 of the clamp retention mechanism. The first elongate object receiving portion 25 and the second elongate object receiving portion 30 are sized and shaped to cooperatively hold an elongate object 5 at a desired position when the first clamp half 15 and the second clamp half 15 are fastened together. The first portion 40 of the clamp retention mechanism and the second portion 45 of the clamp retention mechanism are sized and shaped to engage each other when the first clamp half 15 and the second clamp half 20 are moved towards each other in a first direction Fa, Fb, or Fa and Fb and are further sized and shaped to fasten the first clamp half 15 and the second clamp half 20 together to achieve a fastened clamp state. The first portion 40 of the clamp retention mechanism and the second portion 45 of the clamp retention mechanism are further sized and shaped to engage each other when the first clamp half 15 and the second clamp half 20 are moved toward each other in a second direction Ea, Eb, or Ea and Eb that is orthogonal to the first direction Fa, Fb, or Fa and Fb to fasten the first clamp half 15 to the second clamp half 20 to achieve the fastened state, such that the clamp 10 is configured to permit fastening from either of two orthogonal directions.

One will appreciate that the sliding alignment features of the levers 37 and the landing pads 38 may include complementary sub features, such as small nubs and complementary pockets that mate when the clamp halves 15 and 20 have been completely slidably engaged. Such complementary sub features may be sufficiently prominent to prevent inadvertent slidable disengagement and may be sufficiently accommodating to permit disengagement by intentional manual sliding.

Optionally, mechanical fasteners 60 may be additionally used to secure the clamp half 15 to the clamp half 20. As illustrated in Figures With reference to FIGS. 1, 2, 7, 7A-7E, 8, 14, 14A, 15, 16, and 17, mechanical fasteners 60 may comprise screws, bolts, or other fasteners that may threaded to fit into an inner threaded aperture in holding members, such as discrete plugs 65 or threaded receptacles formed into the clamp halves 15 and/or 20. The plugs 65 in turn may include a square-shaped or other suitably shaped head that seats in a clamp securing mechanism, such as shaped pockets 67 and/or 68 that may be sized and shaped to hold the heads of the plugs 65 while inhibiting rotation of the plugs 65. In other embodiments, the clamp securing mechanism may include a threaded aperture sized and shaped to receive screws, such as screws 60 and may, for example, be located at the same position as shaped pockets 67 and/or 68. Alternately, the clamp securing mechanism may comprise smooth through bores and the mechanical fasteners may comprise rivets, bolts, or other suitable fasteners. Other suitable mechanical fasteners and clamp securing mechanisms may be used, for example, a bayonet fastener, or Click-Lok™ fastener made by Moller. Alternatively, a holding member may be made integral with clamp half 15, clamp half 20, or both, for example, an internally threaded bore.

The cable clamp 10 may be fastened to a structure such as an interior or exterior surface of a house, office, factory, personal or industrial vehicle, boat, and airplane. For convenience, the structure is presented herein by way of example to a portion of a vehicle 75, such as an industrial material-handling vehicle. For example, with reference to FIGS. 1, 2, 7, 7C-7E, 8, and 14A, the plugs 65 may be inserted into the shaped pockets 67, and the clamp half 15 (or the clamp half 20) may be pressed into place on the vehicle portion 75 by pushing the plugs 65 through apertures 80 in the vehicle portion 75. A friction fit may be formed between the plugs 65 and the apertures 80 such that the first clamp half 15 is fastened to the vehicle portion 75. Other suitable manners for fastening to a structure may be used, for example, using a click fastening.

Should the positioned first clamp half 15 need to be repositioned, pulling in the opposite direction of direction F may release the plugs 65 from the apertures 80 so the clamp half 15 may be repositioned by inserting the plugs 65 into different apertures 80. Other suitable manners for unfastening the first clamp half 15 from a structure may be used. For example, with reference to FIGS. 7A and 7B, the plugs 65 may be shaped and sized such that they are pushed into an aperture 80 for a friction or click fit, and they may be unfastened by partially screwing (such as in a clockwise direction 76) a screw 60 into the plug 65. In response to partial insertion of the screw 60, the plug 65 may have a portion proximal to the screw 60 expand (such as in an outward direction 77) while a portion distal from the screw 60 contracts (such as in an inward direction 78) and facilitates removing the plug 65 from aperture 80 (such as in a reverse direction 79).

One will appreciate that in some embodiments either just the first clamp half 15 or the second clamp half 20 may be positioned or repositioned as just described. In other embodiments, the entire cable clamp 10 may be fastened, as illustrated in FIG. 3, and then positioned or repositioned while the first clamp half 15 and the second clamp half 20 are fastened together.

Figure 8:
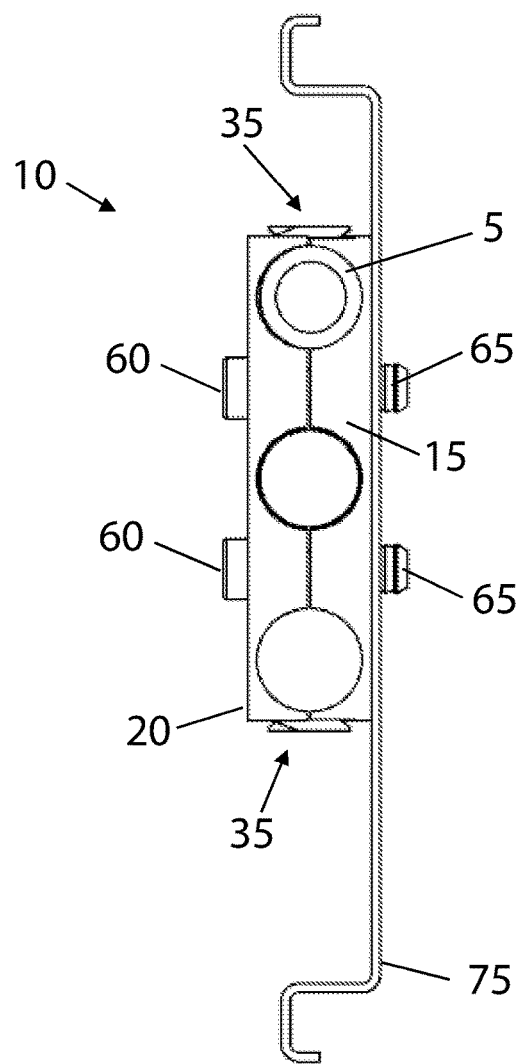
FIG. 8 illustrates the clamp of FIG. 3 secured to the structure.
Figure 8A:
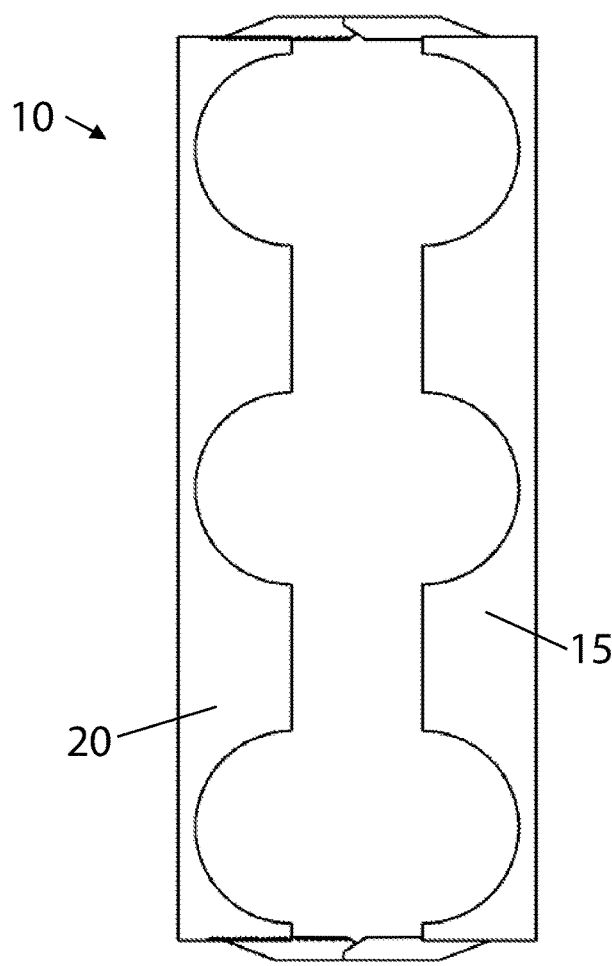
FIG. 8A illustrates a front view of two clamp halves prior to engagement with each other.

The cable clamp 10 may also be secured to a structure, such as a portion of a vehicle 75 as illustrated in FIG. 8. For example, with reference to FIGS. 1, 2, 7, 7C-7E, 8, and 14A, the plugs 65 may be inserted into the shaped pockets 67, and the clamp half 15 (or the clamp half 20) may be pressed into place on the vehicle portion 75 by pushing the plugs 65 through the apertures 80 in the vehicle portion 75. Then, cables 5 may be positioned into cable receiving portions 25 and the second clamp half 20 may be fastened to the first clamp half 15. The screws 60 may then be inserted through the clamp securing mechanism, which in the illustrated embodiment may comprise the shaped pockets 67 and/or 68 and/or the plugs 65. A screwdriver, drill, or other suitable tool may be employed to engage the screws 60 and move them into the plugs 65 causing the plugs 65 to expand against the sidewalls of the apertures 80, thus securing the cable clamp 10 to the vehicle portion 75, or other suitable structure with a fit that is tighter and stronger than the fit of simply fastening the plugs 65 into apertures 80.

One will also appreciate that instead of "building" the cable clamp 10 while the first half 15 is fastened to the vehicle portion 75, the cable clamp 10 may be assembled by positioning the cables 5 in the cable receiving portions 25 and 30 and then fastening the first and second clamp halves 15 and 20 together before plugs 65 are inserted into apertures 80. Alternatively, a cable clamp 10 may include a clamp securing mechanism comprising smooth through bores, and the cable clamp 10 may be fastened around cables and then placed adjacent a structure and riveted or bolted into place. Moreover, the clamps 10 may be secured to a structure without the use of a plug 65. Other suitable mechanical fasteners and clamp securing mechanisms may be used to secure a cable clamp 10 to a structure.

In other embodiments, the cable clamp halves 15 and 20 may be fastened together without fastening or securing the cable clamp 10 to a structure. Optionally, the cable clamp halves 15 and 20 may be secured together without securing the cable clamp 10 to a structure. For example, with reference to FIG. 9, the clamp securing mechanism may comprise, or cooperate with, plugs 65 with sufficient length to extend into both the shaped pockets 67 and 68, and a screw 60 may be inserted into each of the plugs 65 to expand the plugs and secure the clamp halves 15 and 20 together. Or, the clamp securing mechanism may comprise one or more threaded apertures and the two halves may be screwed together. As another example, the clamp securing mechanism may comprise one or more smooth bore apertures and the two halves may be riveted or bolted together. Alternatively, a mechanical fastener 60, such as a screw or bolt, can be toollessly and/or without rotation press fit through a plug 65, such as a plug 65 configured with internal ridges or nubs. Unsecuring from such plug 65 may, however, be facilitated by rotation, with or without a tool.

One will also appreciate that many different variations in the numbers of bole holes 66, shaped pockets 67 and 68, and external shaped pockets 59. For example, in some embodiments, one or both of the clamp halves 15 and 20 may have only a single shaped pocket 67 or 68, and the bole hole 66 for the mechanical fastener 60 may be aligned with the shaped pocket 67 or 68. In some embodiments, one or both of the clamp halves 15 and 20 may have only a single shaped pocket 67 or 68, and the bole hole 66 for the mechanical fastener 60 may be distinct from the shaped pocket 67 or 68 such that the mechanical fastener 60 is configured to directly contact the vehicle portion 75. Moreover, one or both of the clamp halves 15 and 20 may have all or more than the bole holes 66, the shaped pockets 67 and 68, and the external shaped pockets 59 shown in the figures; and only some of them may be used for the plugs 65, the mechanical fasteners 60, and the nuts 74.

One will also appreciate that the number of bole holes 66, shaped pockets 67 and 68, and external shaped pockets 59, plugs 65, mechanical fasteners 60, the nuts 74 employed may depend on the number of cable receiving portions 25 and 30 present and/or on the number or location of the of cables 5 that are clamped. For example, clamp halves 15 and 20 that are configured to hold only up to two cables 5 may employ a single set of bole holes 66, shaped pockets 67 and 68, and/or external shaped pockets 59 that may be positioned between the two sets of cable receiving portions 25 and 30. Alternatively, clamp halves 15 and 20 that are configured to hold three or more cables 5 may employ a single set of bole holes 66, shaped pockets 67 and 68, and/or external shaped pockets 59 that may be positioned between the sets of cable receiving portions 25 and 30. In such embodiment, plugs 65, mechanical fasteners 60, and/or nuts 74 may be employed in both sets of bore holes 66, shaped pockets 67 and 68, and/or external shaped pockets 59.

Two or more of the clamps 10 can be stacked and held together with longer mechanical fasteners 60, such as longer bolts or longer screws. In this regard, FIG. 14B illustrates a cross-sectional side view of a stack of aligned clamps 10 secured to a vehicle portion 75, FIG. 14C illustrates a cross-sectional side view of a stack of aligned clamps 10 secured to each other, and FIG. 14D illustrates a cross-sectional side view of a stack of clamps 10 in offset alignment secured to a vehicle portion 75. With respect to FIG. 14B, a plug 65 can optionally be used to press fit the outer side 58 of a half clamp 20 to the outer side 58 of a half clamp 15, for example, to keep the half clamp 20 in place before cables 5 are enclosed and mechanical fasteners 60 are employed. One will also appreciate that more than two clamps 10 can be stacked together with numerous variations of the relative positions to each other and the placement of plugs 65, mechanical fasteners 60, and nuts 74.

Figure 10:
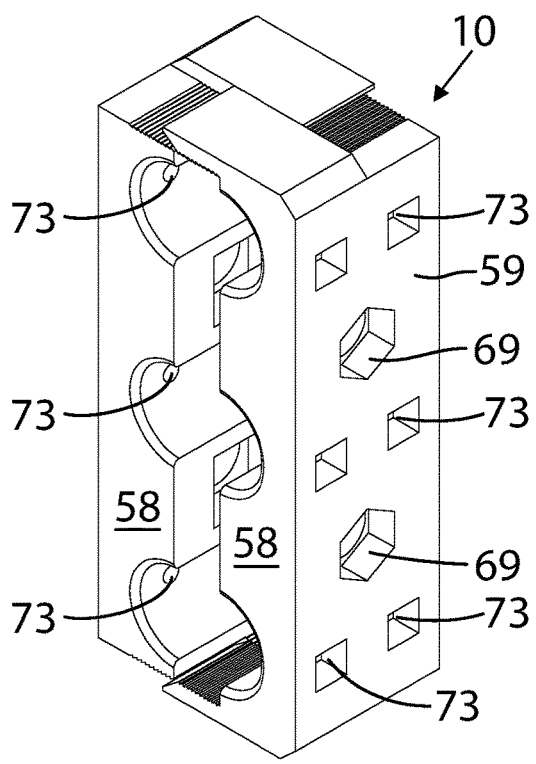
FIG. 10 illustrates an isometric view of an alternative embodiment of the clamp in an unfastened state.
Figure 11:
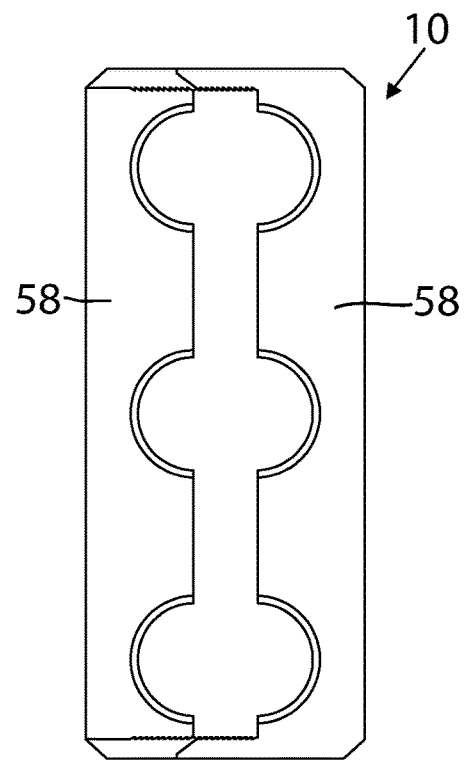
FIG. 11 illustrates a side view of an alternative embodiment of the clamp in an unfastened state.
Figure 12:
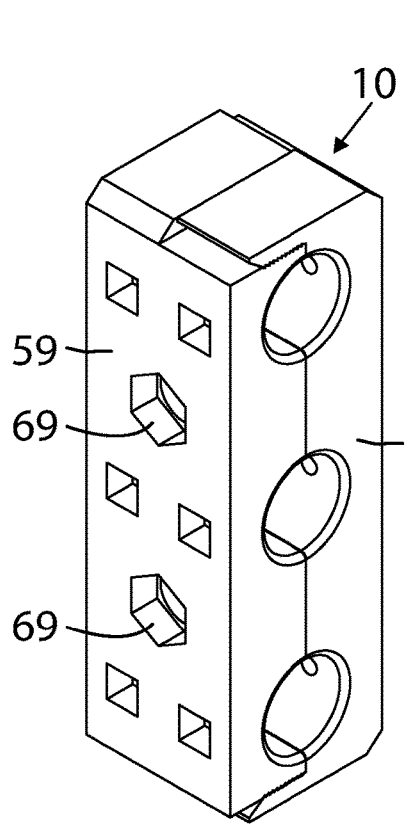
FIG. 12 illustrates an isometric view of an alternative embodiment of the clamp in a fastened state.
Figure 13:
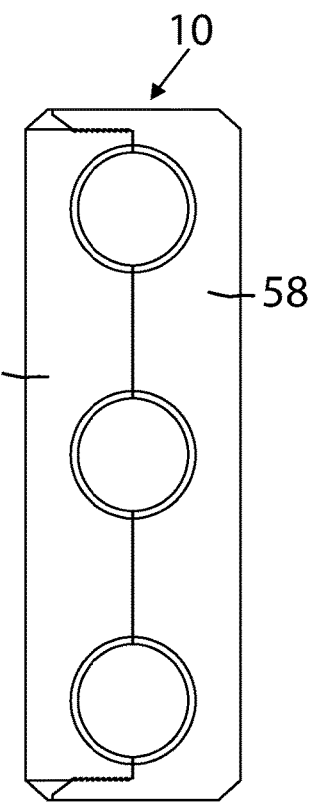
FIG. 13 illustrates a side view of an alternative embodiment of the clamp in a fastened state.
Figure 15:
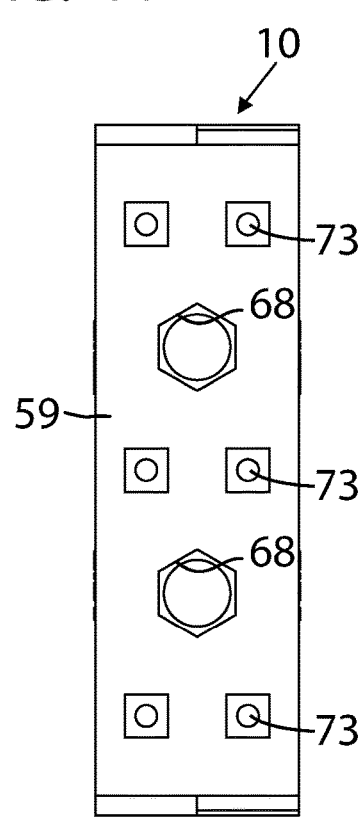
FIG. 15 illustrates a front view of an alternative embodiment of the clamp in a fastened state.
Figure 14:
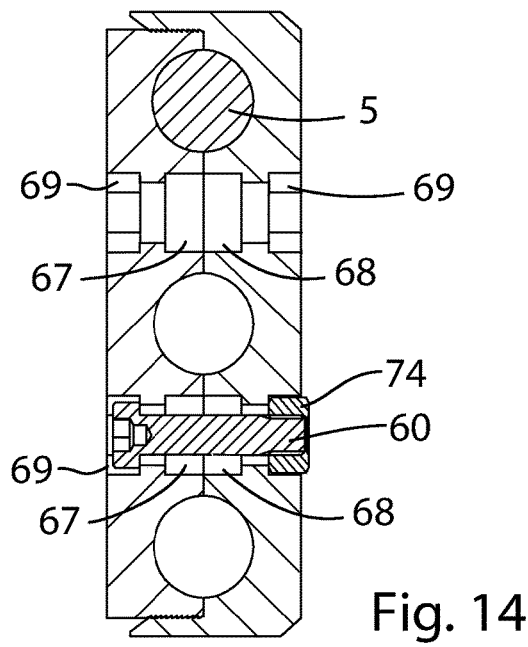
FIG. 14 illustrates a cross-sectional side view of an alternative embodiment of the clamp in a partly secured state.
Figure 16:
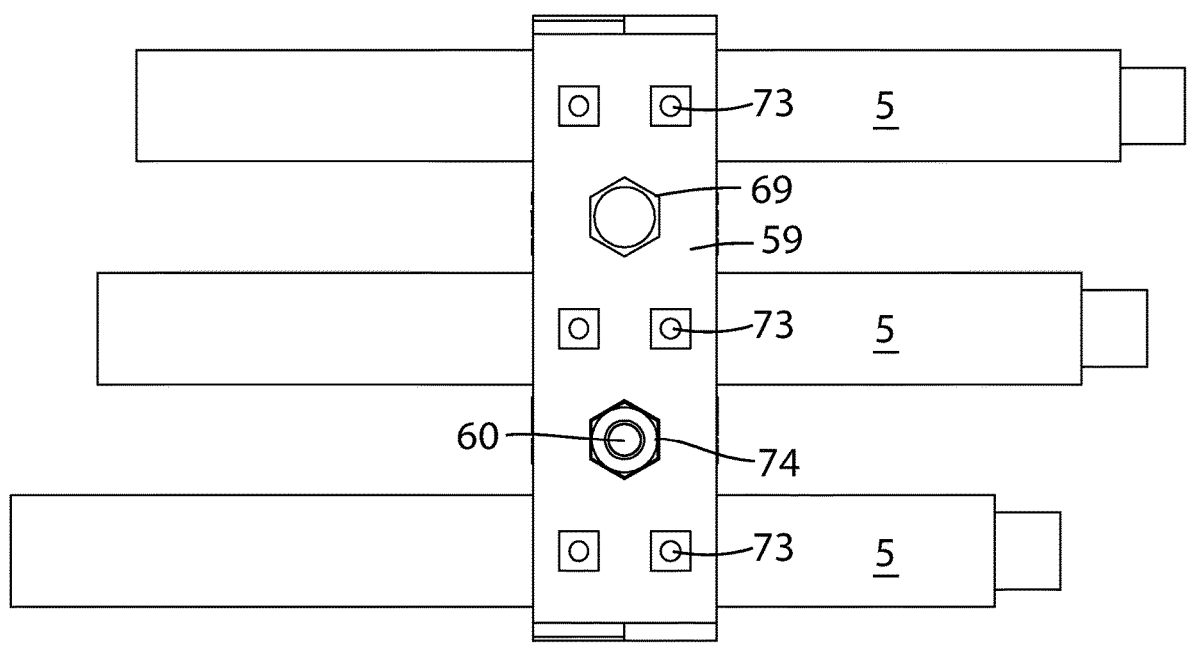
FIG. 16 illustrates a front view of an alternative embodiment of the clamp supporting multiple cables in a fastened and secured state.
Figure 14A:
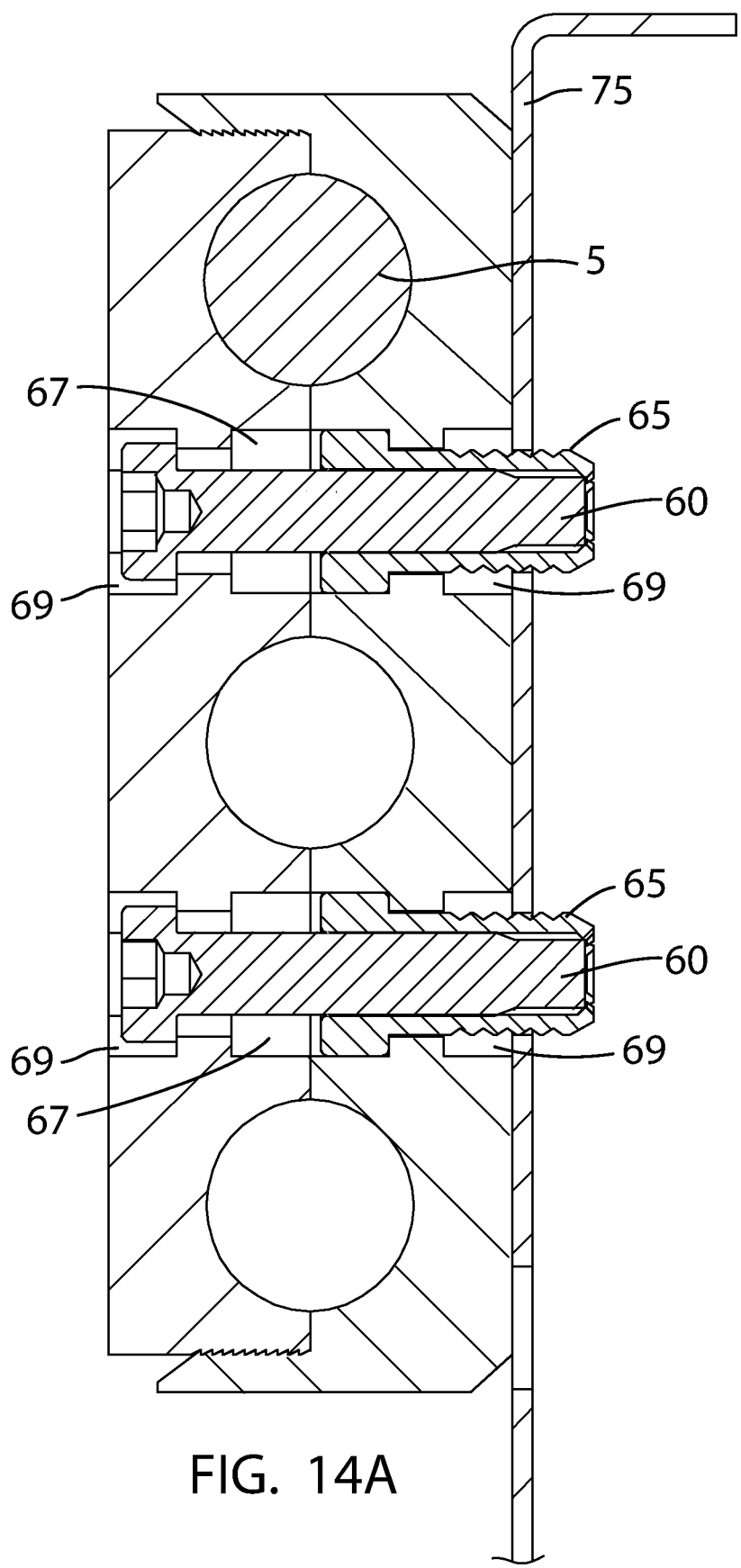
FIG. 14A illustrates a cross-sectional side view of an alternative embodiment of the clamp secured to a structure.
Figure 14B:
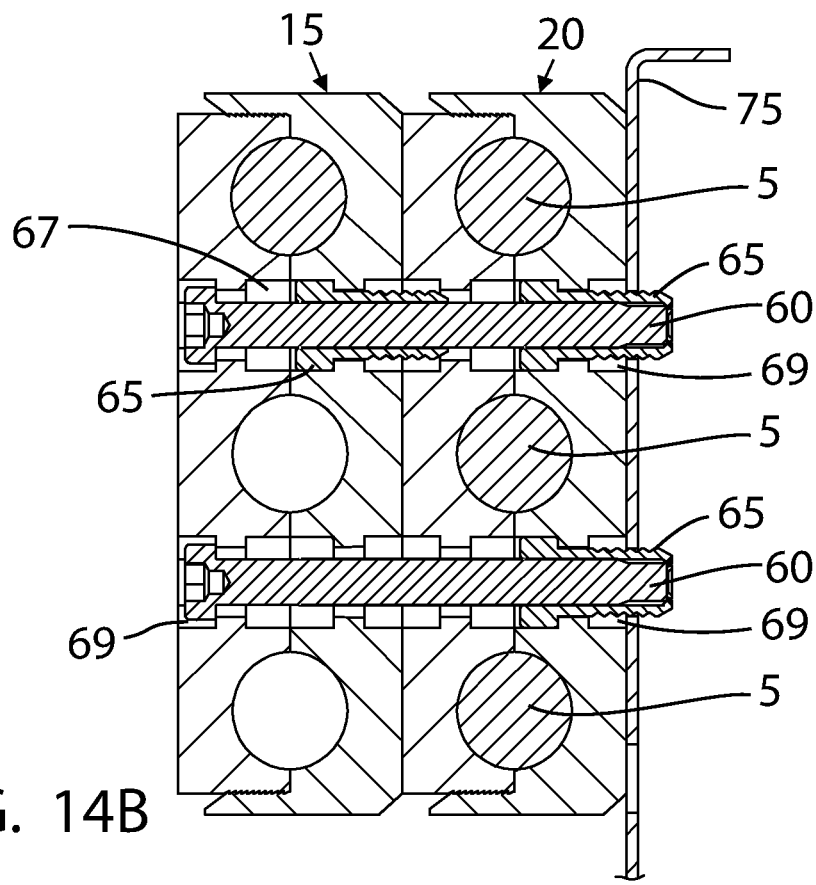
FIG. 14B illustrates a cross-sectional side view of a stack of aligned clamps secured to a structure.
Figure 14C:
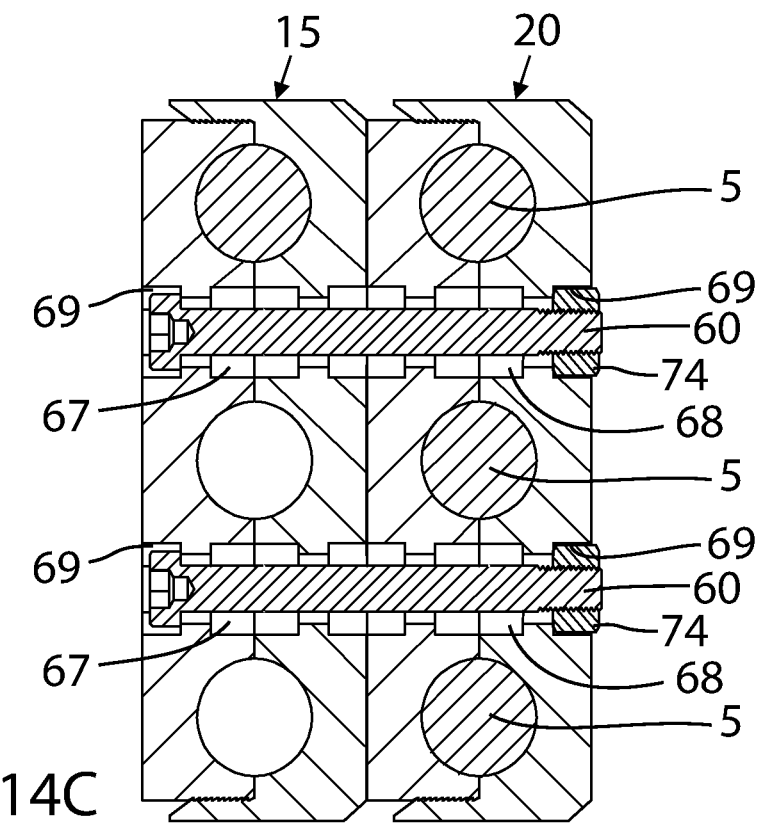
FIG. 14C illustrates a cross-sectional side view of a stack of aligned clamps secured to each other.
Figure 14D:
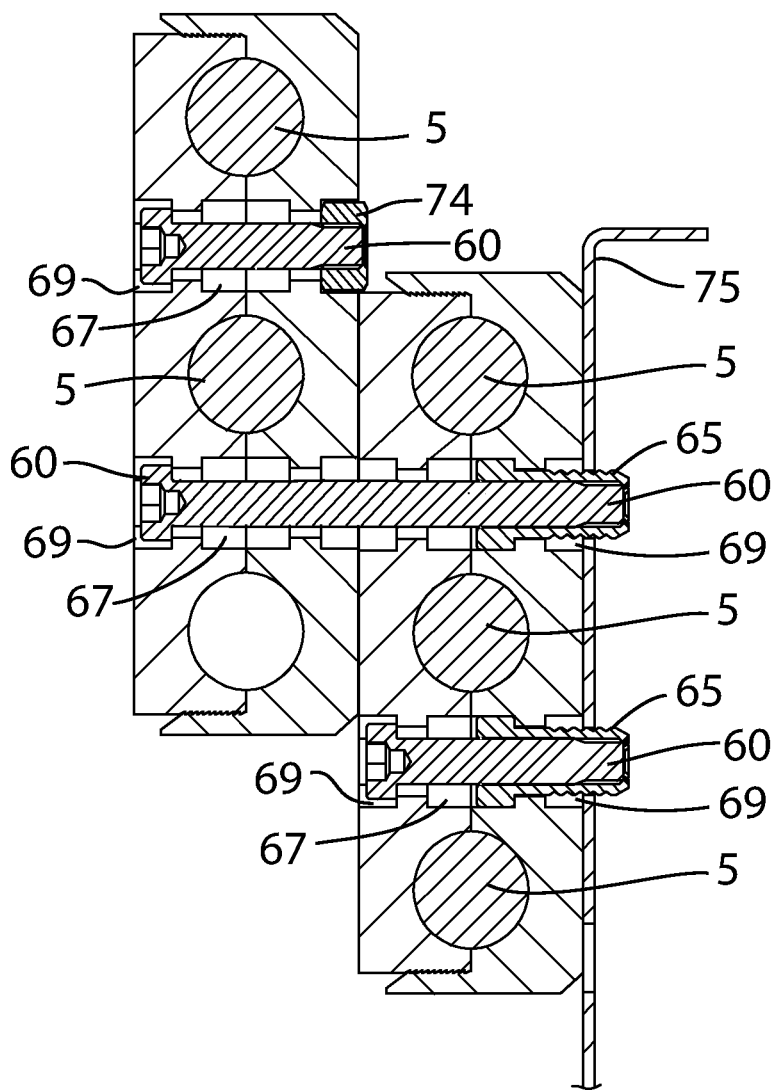
FIG. 14D illustrates a cross-sectional side view of a stack of clamps in offset alignment secured to a structure.
Figure 16A:
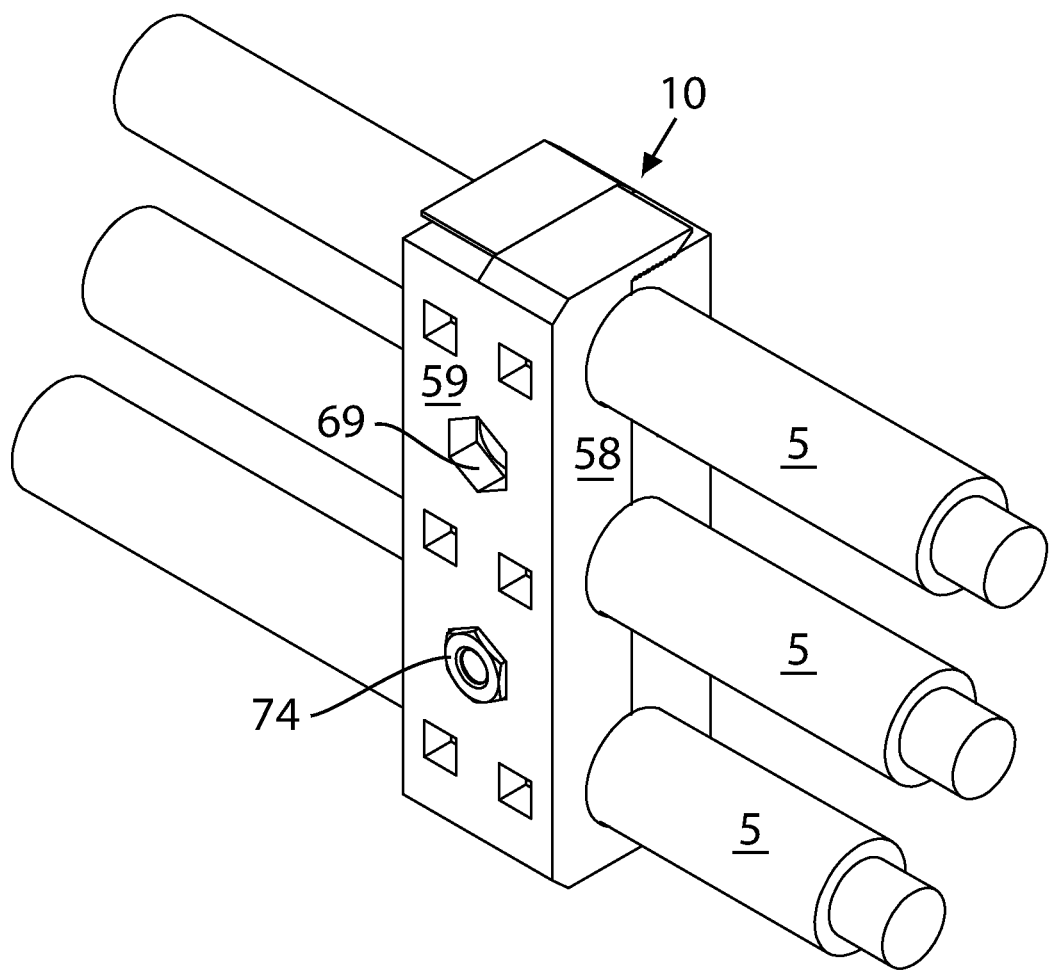
FIG. 16A illustrates an isometric view of an alternative embodiment of the clamp supporting multiple cables in a fastened and secured state.

FIGS. 10-14, 14A, and 15-17 illustrate an alternative embodiment of clamp 10. FIGS. 10 and 11 illustrate the alternative embodiment of clamp 10 in unfastened configurations. FIGS. 12, 13, and 15 illustrate the alternative embodiment of clamp 10 in fastened configurations. FIGS. 14, 16, and 17 illustrate the alternative embodiment of clamp 10 in fastened configurations that have been further secured with one nut 74 and an appropriate mechanical fastener such as a screw 60. FIG. 14A illustrates the alternative embodiment of the clamp 10 in a fastened configuration that has been further secured by two plugs 65 and two screws 60.

The clamp 10 shown in these figures may simplify manufacturing, particularly in ease of 3D printing. One noticeable difference includes the relatively filled-in and smooth side faces 59 compared to those of the embodiment shown in FIG. 4. With reference to FIGS. 14 and 14A, external shaped pockets 69 in the end faces 59 can be aligned with the bore holes 66 associated with the shaped pockets 67 and 68 and can be sized and shaped to accept a nut 74. Such embodiments may be useful when the clamp 10 is intended to be free standing and not intended to be mounted on a structure.

One will appreciate that the external shaped pockets 69 on both clamp halves 15 and 20 may be identical, or they may be different. In some embodiments, the external shaped pockets 69 are configured to hold the nut 74 in a manner that prevents the nut from rotating, and the external shaped pockets 69 may be simultaneously configured to permit the head of a screw 60 to be rotated to allow the head, when the screw 60 is tightened, to be recessed within the external shaped pocket 69 on the opposing clamp half. One will also appreciate that the size and shape of the external shaped pockets 69 may be configured to accommodate the choice of a nut 74 or a plug 65 so one clamp half can satisfy either a mounted or an unmounted application.

Figure 18:
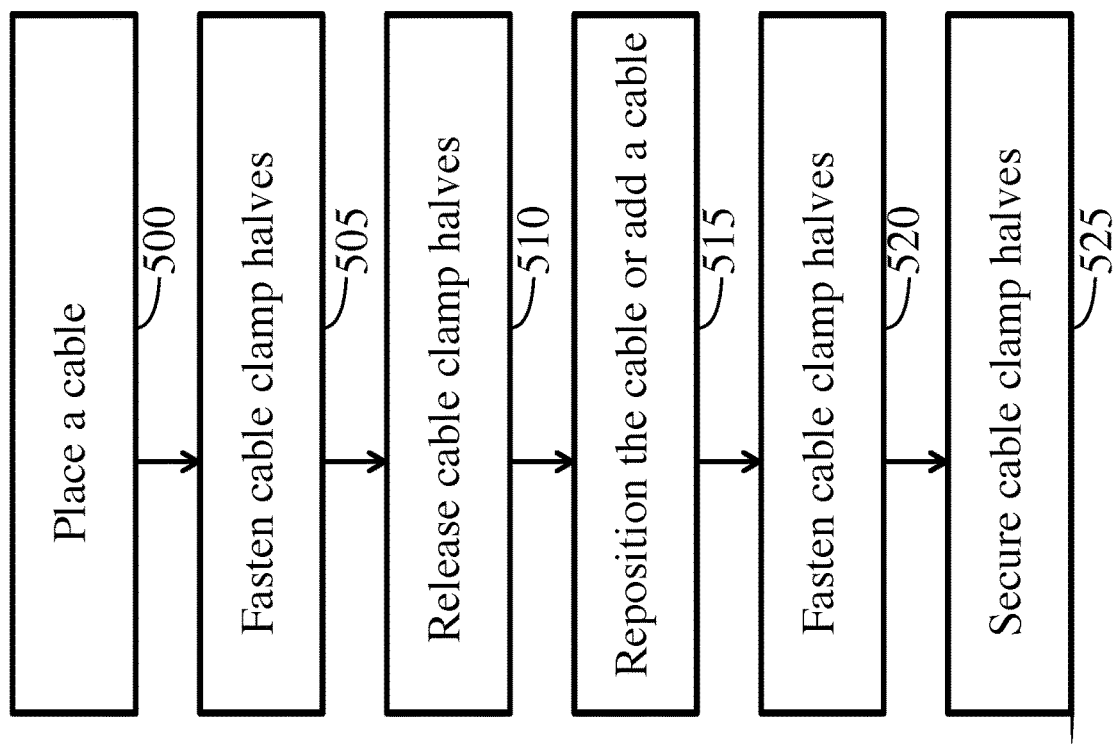
FIG. 18 illustrates an example method of clamping a cable.

With reference to FIG. 18, a method for using a clamp is described. At step 500, a cable 5 is placed into a cable receiving portion 25 of a first clamp half 15 of a cable clamp 10. A second clamp half 20 of the cable clamp 10 is fastened to the first clamp half 15 of the cable clamp 10 via a mechanism 35 configured to fasten with a snap fit without using a tool at step 505. At step 510, the snap fit mechanism 35 is optionally released without using a tool, for example, by sliding the second portion 20 of the cable clamp 10 away from the first portion 15 of the cable clamp 10 in a direction orthogonal to direction F (FIG. 7, either "into" or "out of" the paper) to release the snap fit mechanism 35. At step 515, the cable 5 is optionally repositioned in the cable receiving portion 25 and 30. The second half clamp 20 of the cable clamp 10 is optionally fastened to the first half clamp 15 of the cable clamp 10 via the snap fit mechanism 35 without using a tool at step 520. Optionally, the first clamp half 15 of the cable clamp 10 may be secured to the second clamp half 20 of the cable clamp 10 by engaging a mechanical fastener with a tool at step 525.

Figure 19:
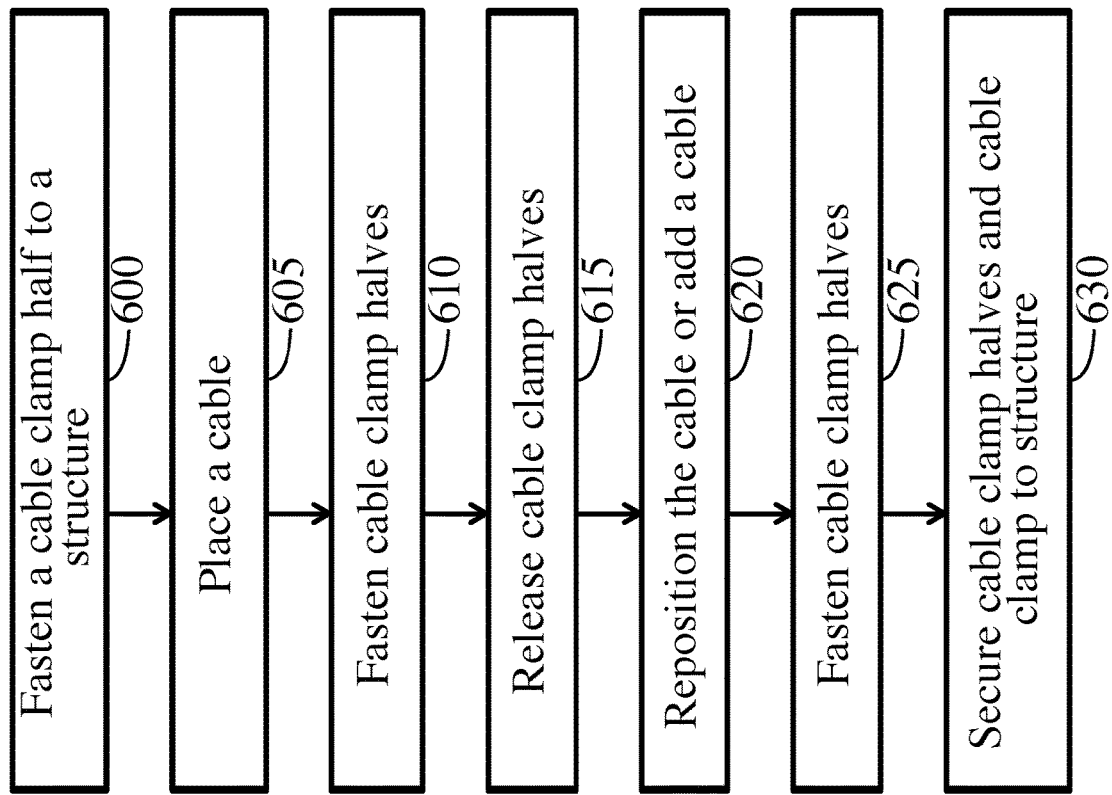
FIG. 19 illustrates another example method of clamping a cable.

With reference to FIG. 19, another method for using a clamp is described. A cable clamp half, such as first clamp half 15, is fastened to a structure at step 600. In some embodiments, a single plug 65 may be employed, or multiple plugs 65 may be employed. Alternatively, one or more internal mechanical fasteners (not shown) may be employed, or a mix of plugs and internal mechanical fasteners may be employed.

At step 605, a cable 5 is placed into a cable receiving portion 25 of the first clamp half 15. A second clamp half 20 of the cable clamp 10 is fastened to the first clamp half 15 of the cable clamp 10 via a mechanism 35 configured to fasten with a snap fit without using a tool at step 610. At step 615, the snap fit mechanism 35 is optionally released without using a tool, for example, by sliding the second clamp half 20 of the cable clamp 10 away from the first clamp half 15 of the cable clamp 10 in a direction orthogonal to direction F (FIG. 7, either "into" or "out of" the paper) to release the snap fit mechanism 35. Optionally, at step 620, the cable 5 is repositioned in the cable receiving portions 25 and 30, or new cables 5 may be added to one or more cable receiving portions 25 and 30. The second clamp half 20 of the cable clamp 10 is optionally fastened to the first clamp half 15 of the cable clamp 10 via the snap fit mechanism 35 without using a tool at step 625. Optionally, the first clamp half 15 of the cable clamp 10 may be secured to the second clamp half 20 of the cable clamp 10 by engaging a mechanical fastener with a tool at step 525, and the cable clamp 10 may be secured to a structure, such as a vehicle portion 75, via the same engagement of a tool with the mechanical fastener.

Figure 20:
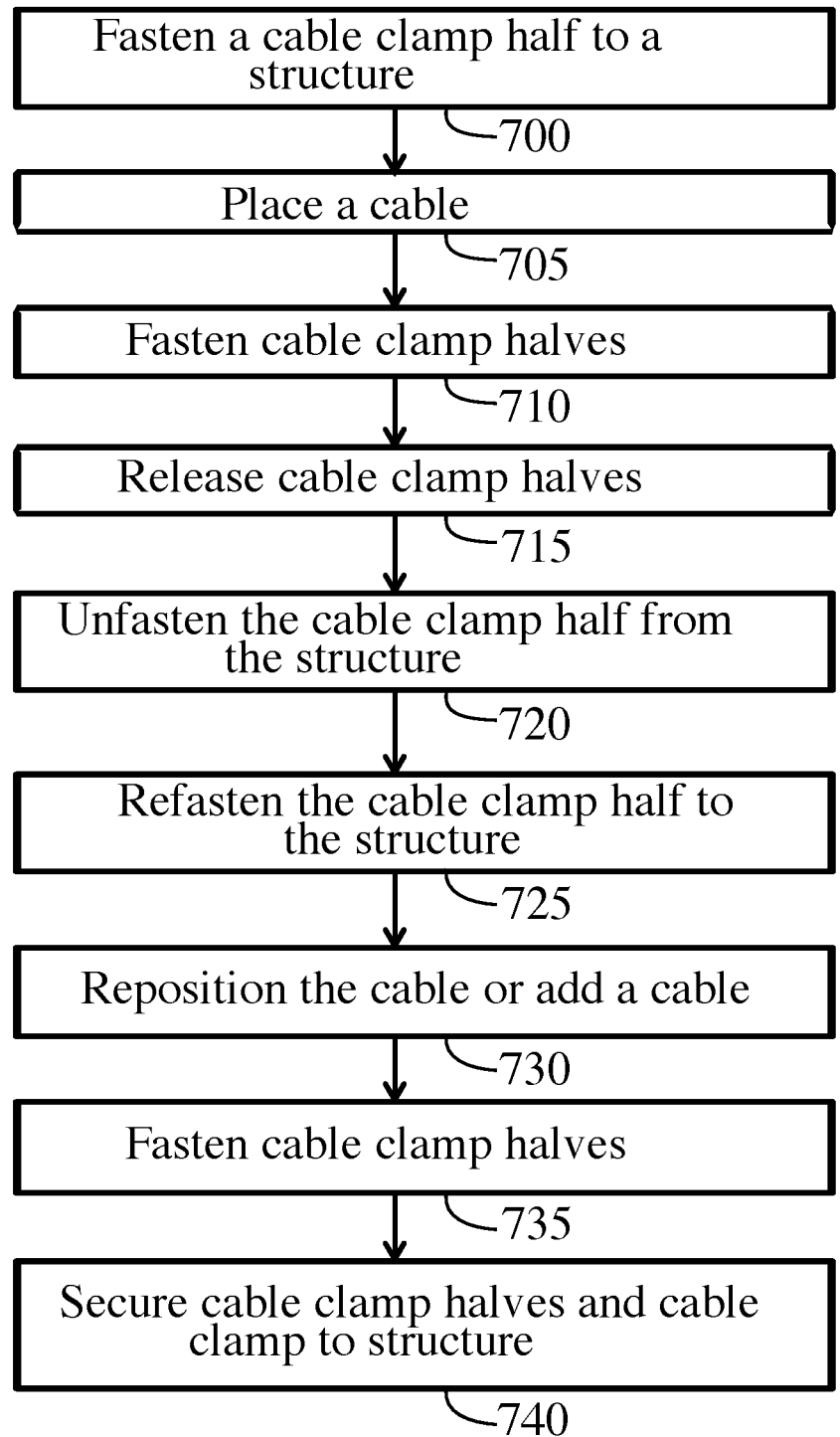
FIG. 20 illustrates another example method of clamping a cable.

With reference to FIG. 20, another method for using a clamp is described. A cable clamp half, such as first clamp half 15, is fastened to a structure at step 700. In some embodiments, a single plug 65 may be employed, or multiple plugs 65 may be employed. Alternatively, one or more internal mechanical fasteners (not shown) may be employed, or a mix of plugs and internal mechanical fasteners may be employed.

At step 705, a cable 5 is placed into a cable receiving portion 25 of the first clamp half 15. Optionally, a second clamp half 20 of the cable clamp 10 is fastened to the first clamp half 15 of the cable clamp 10 via a mechanism 35 configured to fasten with a snap fit without using a tool at step 710. At step 715, the snap fit mechanism 35 is optionally released without using a tool, for example, by sliding the second clamp half 20 of the cable clamp 10 away from the first clamp half 15 of the cable clamp 10 in a direction orthogonal to direction F (FIG. 7, either "into" or "out of"

the paper) to release the snap fit mechanism 35. Optionally, at step 720, the first clamp half 15 is unfastened from the structure. Optionally, at step 725 the first clamp half 15 is refastened to the structure. At step 730, the cable 5 is optionally repositioned in the cable receiving portions 25 and 30, or, optionally, new cables 5 may be added to one or more cable receiving portions 25 and 30. The second clamp half 20 of the cable clamp 10 is optionally fastened to the first clamp half 15 of the cable clamp 10 via the snap fit mechanism 35 without using a tool at step 735. Optionally, the first clamp half 15 of the cable clamp 10 may be secured to the second clamp half 20 of the cable clamp 10 by engaging a mechanical fastener, such as screw 60, with a tool at step 740 and the cable clamp 10 may be secured to a structure, such as a vehicle portion 75, via the same engagement of a tool with the mechanical fastener.

CONCLUSION

The terms and descriptions used above are set forth by way of illustration and example only and are not meant as limitations. Those skilled in the art will recognize that many variations, enhancements, and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive.

The scope of the invention should therefore be determined only by the following claims, claims presented in a continuation patent application, and equivalents to the foregoing claims.

The invention claimed is:

1. A clamp for retaining an elongate object having a longitudinal axis, the clamp comprising:
   a first clamp half comprising a first elongate object receiving portion and a first portion of a clamp retention mechanism, wherein the first portion of the clamp retention mechanism includes a first primary portion and a first secondary portion positioned on respective opposed first primary end and first secondary end of the first clamp half, wherein the first primary portion includes a first primary landing pad and a first primary lever, and wherein the first secondary portion includes a first secondary landing pad and a first secondary lever; and
   a second clamp half comprising a second elongate object receiving portion and a second portion of the clamp retention mechanism, wherein the second portion of the clamp retention mechanism includes a second primary portion and a second secondary portion positioned on respective second opposed second primary end and second secondary end of the second clamp half, wherein the second primary portion includes a second primary landing pad and a second primary lever, and wherein the second secondary portion includes a second secondary landing pad and a second secondary lever;
   wherein the first elongate object receiving portion and the second elongate object receiving portion are sized and shaped to cooperatively hold the elongate object at a desired position when the first clamp half and the second clamp half are fastened together;
   wherein the first portion of the clamp retention mechanism and the second portion of the clamp retention mechanism are sized and shaped to engage each other when the first clamp half and the second clamp half are moved towards each other in a snap direction and are further sized and shaped to fasten the first clamp half and the second clamp half together to engage the clamp retention mechanism in snap-fit engagement, and wherein the snap direction is orthogonal to the longitudinal axis of the elongate object; and
   wherein the first portion of the clamp retention mechanism and the second portion of the clamp retention mechanism are further sized and shaped to disengage from each other when the first clamp half and the second clamp half are slid away from each other in opposite slide directions that are orthogonal to the snap direction to unfasten the first clamp half from the second clamp half to disengage the clamp retention mechanism, and wherein the slide directions are along the longitudinal axis of the elongate object.

2. The clamp according to claim 1, wherein the first clamp half and the second clamp half are identical.

3. The clamp according to claim 1, further comprising:
   a clamp securing mechanism, wherein the clamp securing mechanism comprises:
   a first portion of the clamp securing mechanism associated with the first clamp half; and
   a second portion of the clamp securing mechanism associated with the second clamp half.

4. The clamp according to claim 3, further comprising:
   a tool-based mechanical fastener sized and shaped to engage the clamp securing mechanism and to secure the first clamp half and the second clamp half together requiring use of a securing tool to engage the mechanical fastener with the clamp securing mechanism.

5. The clamp according to claim 3, wherein the first portion of the clamp securing mechanism comprises an aperture that is sized and shaped to non-rotationally retain a holding member which is sized and shaped to fit within the first portion of the clamp securing mechanism, the clamp further comprising:
   a tool-based mechanical fastener sized and shaped to engage the holding member and to secure the first clamp half and the second clamp half together requiring use of a securing tool to engage the tool-based mechanical fastener with the holding member.

6. The clamp according to claim 5, wherein the holding member comprises a plug that is sized and shaped to pass through the first portion of the clamp securing mechanism to facilitate fastening the first clamp half to a structure without use of a clamp affixing tool.

7. The clamp according to claim 6, wherein the first clamp half and the second clamp half are identical.

8. The clamp according to claim 7, wherein: a portion of the plug that is sized and shaped to pass through the first portion of the clamp securing mechanism (i) is further sized and shaped to have a press fit with an aperture in the structure, (ii) further comprises a threaded aperture that is sized and shaped to receive the mechanical fastener, and (iii) is further sized and shaped to expand when receiving the mechanical fastener such that an interaction between the plug and the aperture in the structure becomes tighter than the press fit.

9. The clamp according to claim 1, wherein:
   the first portion of the clamp retention mechanism comprises a first series of teeth;
   the second portion of the clamp retention mechanism comprises a second series of teeth; and the first series of teeth and the second series of teeth are sized and shaped to create a cantilever snap fit when the clamp retention mechanism is engaged.

10. The clamp according to claim 9, wherein:
the first portion of the clamp retention mechanism further comprises a third series of teeth located on a side of the first clamp half opposite from a location of the first series of teeth;
the second portion of the clamp retention mechanism further comprises a fourth series of teeth located on a side of the second clamp half opposite from a location of the second series of teeth; and
the third series of teeth and the fourth series of teeth are sized and shaped to create a cantilever snap fit when the clamp retention mechanism is engaged.

11. The clamp according to claim 10, further comprising:
a first portion of a clamp securing mechanism associated with the first clamp half; and
a second portion of the clamp securing mechanism associated with the second clamp half.

12. The clamp according to claim 11, further comprising a tool-based mechanical fastener sized and shaped to engage the clamp securing mechanism and to secure the first clamp half and the second clamp half together requiring use of a securing tool to engage the mechanical fastener with the clamp securing mechanism.

13. The clamp according to claim 11, wherein the first portion of the clamp securing mechanism comprises an aperture that is sized and shaped to non-rotationally retain a holding member, the clamp further comprising:
the holding member sized and shaped to fit within the first portion of the clamp securing mechanism; and
a tool-based mechanical fastener sized and shaped to engage the holding member and to secure the first clamp half and the second clamp half together requiring use of a securing tool to engage the mechanical fastener with the holding member.

14. The clamp according to claim 13, wherein the holding member comprises a plug that is sized and shaped to pass through the first portion of the clamp securing mechanism to facilitate fastening the first clamp half to a structure without use of a clamp affixing tool.

15. The clamp according to claim 14, wherein the first clamp half and the second clamp half are identical.

16. The clamp according to claim 15, wherein a portion of the plug that is sized and shaped to pass through the first portion of the clamp securing mechanism (i) is further sized and shaped to have a press fit with an aperture in the structure, (ii) further comprises a threaded aperture that is sized and shaped to receive the mechanical fastener, and (iii) is further sized and shaped to expand when receiving the mechanical fastener such that an interaction between the plug and the aperture in the structure becomes tighter than the press fit.

17. The clamp according to claim 1 further comprising a plurality of first elongate object receiving portions and a plurality of second elongate object receiving portions.

18. A method for clamping an elongate object having a longitudinal axis, the method comprising:
placing the elongate object into a receiving portion of a first clamp half of a clamp, wherein the first clamp half includes a first portion of a clamp retention mechanism, wherein the first portion of the clamp retention mechanism includes a first primary portion and a first secondary portion positioned on respective opposed first primary end and first secondary end of the first clamp half, wherein the first primary portion includes a first primary landing pad and a first primary lever, and wherein the first secondary portion includes a first secondary landing pad and a first secondary lever;
moving a second clamp half of the clamp to the first clamp half of the clamp in a snap direction that is orthogonal to the longitudinal axis of the elongate object to fasten the second clamp half to the first clamp half via the clamp retention mechanism configured to fasten with a snap-fit engagement, wherein the second clamp half includes a second portion of the clamp retention mechanism, wherein the second portion of the clamp retention mechanism includes a second primary portion and a second secondary portion positioned on respective second opposed second primary end and second secondary end of the second clamp half, wherein the second primary portion includes a second primary landing pad and a second primary lever, and wherein the second secondary portion includes a second secondary landing pad and a second secondary lever;
sliding the second clamp half of the clamp away from the first clamp half of the clamp in opposite slide directions that are orthogonal to the snap direction and are along the longitudinal axis of the elongate object to release the clamp retention mechanism configured to fasten with the snap-fit engagement;
repositioning the elongate object in the receiving portion;
fastening the second clamp half of the clamp to the first clamp half of the clamp via the clamp retention mechanism configured to fasten with the snap-fit engagement; and
securing the first clamp half of the clamp to the second clamp half of the clamp by engaging a tool-based mechanical fastener with a securing tool.

19. The method according to claim 18, further comprising:
fastening the first clamp half of the clamp to a structure; and
wherein securing the first clamp half of the clamp to the second clamp half of the clamp by engaging the tool-based mechanical fastener with the securing tool further comprises simultaneously securing the clamp to the structure via the tool-based mechanical fastener.

20. The method according to claim 19, further comprising:
unfastening the first clamp half of the clamp from the structure; and
refastening the first clamp half of the clamp to the structure.

21. A clamp for retaining an elongate object having a longitudinal axis, the clamp comprising:
a first clamp half comprising a first elongate object receiving portion and a first portion of a clamp retention mechanism, wherein the first portion of the clamp retention mechanism includes a first primary portion and a first secondary portion positioned on respective opposed first primary end and first secondary end of the first clamp half, wherein the first primary portion includes a first primary landing pad and a first primary lever, and wherein the first secondary portion includes a first secondary landing pad and a first secondary lever; and
a second clamp half comprising a second elongate object receiving portion and a second portion of the clamp retention mechanism, wherein the second portion of the clamp retention mechanism includes a second primary portion and a second secondary portion positioned on respective second opposed second primary end and second secondary end of the second clamp half, wherein the second primary portion includes a second primary landing pad and a second primary lever, and wherein the second secondary portion includes a second secondary landing pad and a second secondary lever;

wherein the first elongate object receiving portion and the second elongate object receiving portion are sized and shaped to cooperatively hold the elongate object at a desired position when the first clamp half and the second clamp half are fastened together;

wherein the first portion of the clamp retention mechanism and the second portion of the clamp retention mechanism are sized and shaped to engage each other when the first clamp half and the second clamp half are moved towards each other in a snap direction that is orthogonal to the longitudinal axis of the elongate object to fasten the first clamp half and the second clamp half together to achieve a first fastened clamp state; and wherein the first portion of the clamp retention mechanism and the second portion of the clamp retention mechanism are further sized and shaped to engage each other when the first clamp half and the second clamp half are moved toward each other in opposite slide directions that are orthogonal to the snap direction to fasten the first clamp half to the second clamp half to achieve a second fastened clamp state, such that the clamp is configured to permit fastening from either of two orthogonal directions.

22. The clamp according to claim 21, wherein the first fastened clamp state and the second fastened clamp state are identical.

23. The clamp according to claim 21, wherein the first clamp half and the second clamp half are configured to achieve the first fastened clamp state and the second fastened clamp state without employing an additional separate fastener.

24. A cable clamp kit for retaining an elongate object having a longitudinal axis, the clamp kit comprising:
 a first clamp half comprising a first elongate object receiving portion, a first portion of a clamp retention mechanism, and a first portion of a clamp securing mechanism that comprises an aperture that is sized and shaped to non-rotationally retain a holding member, wherein the first portion of the clamp retention mechanism includes a first primary portion and a first secondary portion positioned on respective opposed first primary end and first secondary end of the first clamp half, wherein the first primary portion includes a first primary landing pad and a first primary lever, and wherein the first secondary portion includes a first secondary landing pad and a first secondary lever;
 a second clamp half comprising a second elongate object receiving portion, a second portion of the clamp retention mechanism, and a second portion of the clamp securing mechanism, wherein the second portion of the clamp retention mechanism includes a second primary portion and a second secondary portion positioned on respective second opposed second primary end and second secondary end of the second clamp half, wherein the second primary portion includes a second primary landing pad and a second primary lever, and wherein the second secondary portion includes a second secondary landing pad and a second secondary lever, wherein the first elongate object receiving portion and the second elongate object receiving portion are sized and shaped to cooperatively hold the elongate object at a desired position when the first clamp half and the second clamp half are fastened together, wherein the first portion of the clamp retention mechanism and the second portion of the clamp retention mechanism are sized and shaped to engage each other when the first clamp half and the second clamp half are moved towards each other in a snap direction that is orthogonal to the longitudinal axis of the elongate object to fasten the first clamp half and the second clamp half together to engage the clamp retention mechanism, and wherein the first portion of the clamp retention mechanism and the second portion of the clamp retention mechanism are further sized and shaped to disengage from each other when the first clamp half and the second clamp half are slid away from each other in opposite slide directions that are orthogonal to the snap direction to unfasten the first clamp half from the second clamp half to disengage the clamp retention mechanism;
 a set of half grommets, each having an inner grommet surface and an outer grommet surface that is configured to fit within the first elongate object receiving portion and the second elongate object receiving portion, wherein the set of half grommets include first half grommets having a first thickness between the inner grommet surface and the outer grommet surface, wherein the set of half grommets include second half grommets having a second thickness between the inner grommet surface and the outer grommet surface, and wherein the first grommet thickness and the second grommet thickness are different;
 a first holding member that comprises a plug that is sized and shaped to pass through the first portion of the clamp securing mechanism to facilitate fastening the first clamp half to a structure without use of an affixing tool; and
 a tool-based mechanical fastener sized and shaped to engage the clamp securing mechanism and to secure the first clamp half and the second clamp half together requiring use of a securing tool to engage the mechanical fastener with the clamp securing mechanism.

25. The clamp according to claim 1, wherein the first primary landing pad of the first primary portion is sized and shaped to engage the second primary lever of the second primary portion, wherein the first primary lever is sized and shaped to engage the second primary landing pad of the second primary portion, wherein the first secondary landing pad of the first secondary portion is sized and shaped to engage the second secondary lever of the second secondary portion, and wherein the first secondary lever is sized and shaped to engage the second secondary landing pad of the second secondary portion to fasten the first clamp half and the second clamp half together to engage the clamp retention mechanism.

26. The clamp according to claim 1, wherein the first primary landing pad has a toothed external surface, wherein the first primary lever has a toothed internal surface, wherein the first secondary landing pad has a toothed external surface, wherein the first secondary lever has a toothed internal surface, wherein the second primary landing pad has a toothed external surface, wherein the second primary lever has a toothed internal surface, wherein the second secondary landing pad has a toothed external surface, and wherein the second secondary lever has a toothed internal surface.

27. The clamp according to claim 1, wherein the first portion of the clamp retention mechanism and the second portion of the clamp retention mechanism are further sized and shaped to engage each other when the first clamp half and the second clamp half are slid toward each other in opposite directions that are orthogonal to the snap direction, and wherein the first primary lever is sized and shaped to meet the second primary lever and the first secondary lever is sized and shaped to meet the second secondary lever to limit an amount of sliding motion toward each other in opposite directions that are orthogonal to the snap direction.

28. The clamp according to claim 1, wherein the first clamp half and the second clamp half are sized and shaped to fasten the first clamp half and the second clamp half together without requiring use of a tool, and wherein the first clamp half and the second clamp half are sized and shaped to unfasten the first clamp half and the second clamp half from each other without requiring use of a tool.

29. The clamp according to claim 1, wherein the first clamp half and the second clamp half are sized and shaped to fasten the first clamp half and the second clamp half together requiring only one or more human hands to engage the clamp retention mechanism, and wherein the first clamp half and the second clamp half are sized and shaped to unfasten the first clamp half from the second clamp half requiring only one or more human hands to disengage the clamp retention mechanism.

30. The method according to claim 18, wherein the first primary landing pad of the first primary portion is sized and shaped to engage the second primary lever of the second primary portion, wherein the first primary lever is sized and shaped to engage the second primary landing pad of the second primary portion, wherein the first secondary landing pad of the first secondary portion is sized and shaped to engage the second secondary lever of the second secondary portion, and wherein the first secondary lever is sized and shaped to engage the second secondary landing pad of the second secondary portion to fasten the first clamp half and the second clamp half together to engage the clamp retention mechanism.

31. The method according to claim 18, wherein the first primary landing pad has a toothed external surface, wherein the first primary lever has a toothed internal surface, wherein the first secondary landing pad has a toothed external surface, wherein the first secondary lever has a toothed internal surface, wherein the second primary landing pad has a toothed external surface, wherein the second primary lever has a toothed internal surface, wherein the second secondary landing pad has a toothed external surface, and wherein the second secondary lever has a toothed internal surface.

32. The method according to claim 18, wherein the first portion of the clamp retention mechanism and the second portion of the clamp retention mechanism are further sized and shaped to engage each other when the first clamp half and the second clamp half are slid toward each other in opposite directions that are orthogonal to the snap direction, and wherein the first primary lever is sized and shaped to meet the second primary lever and the first secondary lever is sized and shaped to meet the second secondary lever to limit an amount of sliding motion toward each other in opposite directions that are orthogonal to the snap direction.

33. The method according to claim 18, wherein the first clamp half and the second clamp half are sized and shaped to fasten the first clamp half and the second clamp half together without requiring use of a tool, and wherein the first clamp half and the second clamp half are sized and shaped to unfasten the first clamp half and the second clamp half from each other without requiring use of a tool.

34. The method according to claim 18, wherein the first clamp half and the second clamp half are sized and shaped to fasten the first clamp half and the second clamp half together requiring only one or more human hands to engage the clamp retention mechanism, and wherein the first clamp half and the second clamp half are sized and shaped to unfasten the first clamp half from the second clamp half requiring only one or more human hands to disengage the clamp retention mechanism.

35. The clamp according to claim 21, wherein the first primary landing pad of the first primary portion is sized and shaped to engage the second primary lever of the second primary portion, wherein the first primary lever is sized and shaped to engage the second primary landing pad of the second primary portion, wherein the first secondary landing pad of the first secondary portion is sized and shaped to engage the second secondary lever of the second secondary portion, and wherein the first secondary lever is sized and shaped to engage the second secondary landing pad of the second secondary portion to fasten the first clamp half and the second clamp half together to engage the clamp retention mechanism.

36. The clamp according to claim 21, wherein the first primary landing pad has a toothed external surface, wherein the first primary lever has a toothed internal surface, wherein the first secondary landing pad has a toothed external surface, wherein the first secondary lever has a toothed internal surface, wherein the second primary landing pad has a toothed external surface, wherein the second primary lever has a toothed internal surface, wherein the second secondary landing pad has a toothed external surface, and wherein the second secondary lever has a toothed internal surface.

37. The clamp according to claim 21, wherein the first portion of the clamp retention mechanism and the second portion of the clamp retention mechanism are further sized and shaped to engage each other when the first clamp half and the second clamp half are slid toward each other in opposite directions that are orthogonal to the snap direction, and wherein the first primary lever is sized and shaped to meet the second primary lever and the first secondary lever is sized and shaped to meet the second secondary lever to limit an amount of sliding motion toward each other in opposite directions that are orthogonal to the snap direction.

38. The cable clamp kit according to claim 24, wherein the first primary landing pad of the first primary portion is sized and shaped to engage the second primary lever of the second primary portion, wherein the first primary lever is sized and shaped to engage the second primary landing pad of the second primary portion, wherein the first secondary landing pad of the first secondary portion is sized and shaped to engage the second secondary lever of the second secondary portion, and wherein the first secondary lever is sized and shaped to engage the second secondary landing pad of the second secondary portion to fasten the first clamp half and the second clamp half together to engage the clamp retention mechanism.

39. The cable clamp kit according to claim 24, wherein the first primary landing pad has a toothed external surface, wherein the first primary lever has a toothed internal surface, wherein the first secondary landing pad has a toothed external surface, wherein the first secondary lever has a toothed internal surface, wherein the second primary landing pad has a toothed external surface, wherein the second primary lever has a toothed internal surface, wherein the second secondary landing pad has a toothed external surface, and wherein the second secondary lever has a toothed internal surface.

40. The cable clamp kit according to claim 24, wherein the first portion of the clamp retention mechanism and the second portion of the clamp retention mechanism are further sized and shaped to engage each other when the first clamp half and the second clamp half are slid toward each other in opposite directions that are orthogonal to the snap direction, and wherein the first primary lever is sized and shaped to meet the second primary lever and the first secondary lever is sized and shaped to meet the second secondary lever to limit an amount of sliding motion toward each other in opposite directions that are orthogonal to the snap direction.

* * * * *

UNITED STATES PATENT AND TRADEMARK OFFICE
CERTIFICATE OF CORRECTION

PATENT NO. : 12,048,991 B2
APPLICATION NO. : 17/506245
DATED : July 30, 2024
INVENTOR(S) : de Lint et al.

It is certified that error appears in the above-identified patent and that said Letters Patent is hereby corrected as shown below:

In the Specification

In Column 12, Line 3, delete "haves" and insert --halves-- therefor.

In Column 15, Line 1, delete "may threaded" and insert --may be threaded-- therefor.

In Column 18, Line 47, delete "structure," and insert --structure at step 630,-- therefor.

Signed and Sealed this
Third Day of September, 2024

Katherine Kelly Vidal
*Director of the United States Patent and Trademark Office*